Patented Nov. 13, 1945

2,388,963

UNITED STATES PATENT OFFICE 2,388,963

CYANINE DYESTUFFS

Douglas James Fry and John David Kendall, Ilford, England, assignors to Ilford Limited, Ilford, Essex, England, a British company No Drawing. Application January 21, 1938, Serial No. 186,251. In Great Britain January 22, 1937

24 Claims. (Cl. 260—240)

This invention relates to the preparation and use of dyestuffs suitable for sensitising photographic emulsions.

In British Patent Specifications Nos. 426,718, filed 3rd October, 1933, and 428,359, filed 3rd October, 1933 there have been described processes in which five-membered ring compounds containing the grouping

for example, rhodanic acids, have been condensed with a series of heterocyclic nitrogen compounds having thioether or seleno-ether groupings or aminovinyl or substituted aminovinyl groupings in the α or γ position to a nitrogen atom, or with substances such as N.N-dimethyl-glutaconic-aldehyde-di-anilide-hydrochloride or diaryl-formamidines and the like, to form intermediate compounds which may themselves be condensed with quaternary salts of heterocyclic nitrogen compounds containing methyl groups in the α or γ position to the nitrogen atom to form dyestuffs.

It has also been proposed to prepare condensation products by condensing a rhodanic acid or like five-membered ring compound having the group

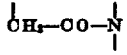

with aldehydes such as, for example, acetaldehyde, benzaldehydes or aminobenzaldehydes.

It is believed that in each of these reactions the reaction takes place on the cyclomethylene group of the five-membered ring compounds.

In the case of rhodanic acid the compounds yielded are of the general type:

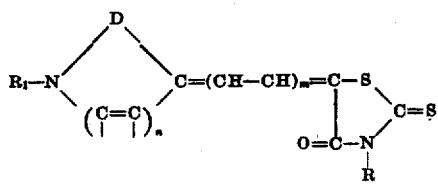

where D represents the remainder of a heterocyclic ring condensed on to the rhodanic acid compound as above,
$n=0$ or 1, and $n_1=0$, 1 or 2 and R=hydrogen, alkyl, aryl or aralkyl group, and $R_1$=alkyl, or of the general type:

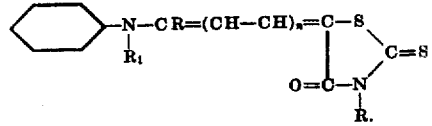

where $n=0$, 1 or 2, R=H, alkyl, aryl or aralkyl and $R_1$=H, alkyl or acyl or of the general type:

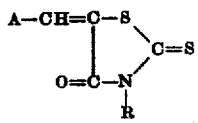

where A is the remainder of an aldehyde.

In the specification accompanying British Patent Application No. 31191/36 a process has been described according to which compounds containing the same grouping, i. e.

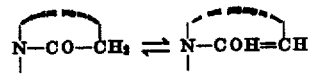

may be condensed in the presence of an acid anhydride e. g. acetic anhydride, and an acid binding agent, for example pyridine, with quaternary salts of heterocyclic nitrogen compounds having a methyl group in the α or γ position to the nitrogen atom.

In this case it is believed that the reaction takes place with the formation of a compound of the type:

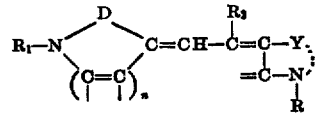

where D represents the remainder of a heterocyclic ring, $n=0$ or 1 and R=H or an alkyl, aryl or aralkyl group, $R_1$ and $R_2$=alkyl and Y=remainder of a five-membered ring.

In the specification accompanying British Patent Application No. 31192/36 a process has been described according to which the compounds produced according to the method of British Patent Application No. 31191/36 comprising a five-membered ring compound containing the system:

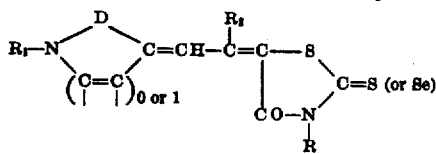

are treated with an alkyl salt to convert the thione or selenone group of the five-membered ring into a reactive grouping and the compounds are then condensed with a large number of other compounds as described therein.

It has now been found that rhodanic acids and similar five-member ring compounds containing the system:

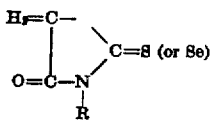

including the compounds obtained according to British patent specifications No. 426,718, filed 3rd October, 1933, and No. 428,359, filed 22nd March, 1935 (divisional of 426,718 filed 3rd October, 1933), and British patent application No. 31192/36 and which may all be regarded as corresponding to the general formula:

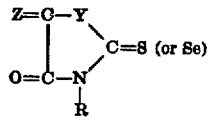

when Y=O, S or Se, R=alkyl, aryl or aralkyl and Z represents $H_2$ or the other groupings attached to the five-membered ring in the compounds produced according to the earlier specifications referred to above, also react with alkyl salts so that the thione or selenone grouping in the five-membered ring is converted into a reactive grouping which can be reacted with compounds containing complementary reactive groupings as described in any of the above-mentioned specifications and in specifications of British Patents No. 431,186, No. 431,187, and No. 432,628, filed 12th June, 1935 (divisionals of No. 431,141, filed 23rd December, 1933), No. 425,609, filed 12th September, 1933, and No. 461,688, filed 27th January, 1937 (divisional of No. 461,688, filed 16th August, 1935), and Nos. 424,559 and 431,141, to yield new dyestuffs.

The present invention accordingly comprises a method of producing dyestuffs by condensing a five-membered heterocyclic ring compound of the type:

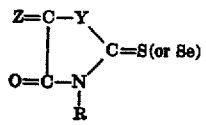

where R may be alkyl, aryl or aralkyl groups, Y may be O, S or Se, and Z may represent $H_2$ or a group corresponding to either of the following formulae:

(A) 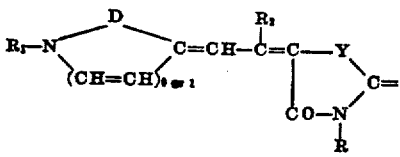

where R, $R_1$ and $R_2$ may be alkyl, aryl or aralkyl groups, Y may be O, S or Se and D is the remainder of a heterocyclic nucleus, or (B) 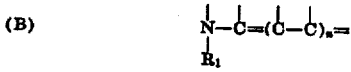

where $R_1$ may be alkyl, aryl or aralkyl grouping and N may be contained in a heterocyclic ring or part of a noncyclic chain or part of an amino group external to a carbocyclic ring which forms part of the chain and $n$ may be 0 or a positive integer (e. g., 1, 2, 3, 4 or 5), or (C)     A—CH= where A represents the remainder of an aldehyde, with an alkyl salt to convert the thione or selenone grouping into a reactive group and condensing the resulting compound with one of the following types of compounds:

(a) A five-membered ring compound containing the system:

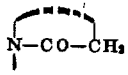

(b) A heterocyclic nitrogen compound having a reactive methyl group or external methylene group or reactive amino or imino group in the α or γ position to one only of the nitrogen atoms.

(c) A compound containing the grouping:

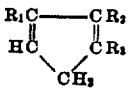

where $R_1$, $R_2$ and $R_3$ may be alkyl, aryl or aralkyl groups or $R_1$ and $R_2$ may be part of the same arylene ring.

(d) Carbocyclic compounds containing a keto methylene group.

(e) Acids or esters of the type:

COOR—$CH_2$—$(CX=CH)_n$—COOR where X=hydrogen or a mono-valent substituent, R=hydrogen or an alkyl or similar group and $n$=0 or 1.

(f) Anhydrides of acids of the general formula:

$CH_3$—$(CX)_{2n-1}$=CH—COOH where X is hydrogen or a monovalent grouping, and $n$ is 1 or 2.

(g) Ammonia or amidines or hydrazines or diamines or their salts.

According to a further feature of the invention when the five-membered ring compounds containing the system:

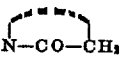

which are condensed with the quaternary salt of the compounds of the formula:

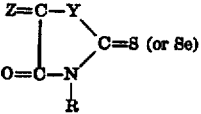

correspond to the general formula:

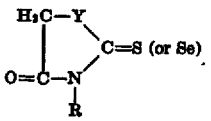

the resulting product conforms to the same general formula as the starting material and so may be treated with an alkyl salt and condensed with any of the compounds enumerated above, that is the process of the invention is repeated to add a further group to the product.

When this second condensation is with a five-member ring compound containing the system:

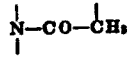

which also corresponds to the general formula:

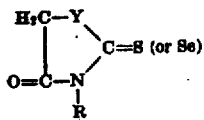

the product will once more conform to the general formula of the starting material, and by proceeding in this way the condensation may be repeated as often as desired; the final product obtained by such a series of condensations may be again condensed according to the invention with any of the other groups by which it is possible to obtain dyestuffs comprising two nuclear groups, for example, heterocyclic nitrogen nuclei, linked by a chain of any desired number of keto-thiazoline rings, which chain may also include other rings such as cyclopentadiene rings or methine groups or nitrogen atoms according to the condensation carried out.

It is believed that in the first part of the process the thione group is converted into a reactive thioether grouping which may then react with any of the other groupings as described in the prior specifications referred to above.

The condensation may be carried out by first carrying out the reaction with the alkyl salt and then reacting the resulting compound with the other compounds or in the case where quaternary salts of heterocyclic nuclei and the like are employed, the two bases may be fused together with the alkyl salt and the reaction completed by heating in the presence of an acid binding substance, for example, pyridine, as described in the specification of British Patent No. 438,420 filed 5th November, 1935.

Examples of five-membered ring compounds of the formula:

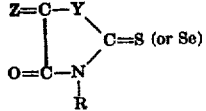

which may be employed in accordance with this invention are the 4-keto-2-thio (or seleno) tetrahydro-thiazoles, 4-keto-2-thio (or seleno) tetrahydro-oxazoles, 4-keto-2-thio (or seleno) tetrahydro-selenazoles or their N-alkyl, N-aryl and N-aralkyl derivatives and their derivatives as obtained by the processes referred to above.

Where heterocyclic nitrogen nuclei are referred to in this specification they may be any of those which have been used or proposed for use in the many processes for the production of cyanine and similar dyestuffs, for example, thiazoles, oxazoles, selenazoles and their polycyclic homologues such as those of the benzene, naphthalene, acenaphthene and anthracene series; pyridine and its polycyclic homologues such as quinoline and naphthaquinoline; lepidines; indolenines; diazines, such as pyrimidines and quinazolines; diazoles (e. g. thio-ββ'-diazole) oxazolines, thiazolines and selenazolines. The polycyclic compounds of these series may also be substituted in the carbocyclic rings with one or more groups such as alkyl, aryl, amino, hydroxy, alkoxy and methylene dioxy groups.

Examples of the compounds having the grouping

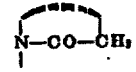

which may be condensed with the compounds of the first group according to our invention are those enumerated in the specification of British Patent No. 426,718, filed 3rd October, 1933, namely, oxindoles, pyrazole-5-ones, hydantoin, thiohydantoin, ψ-hydantoin, ψ-thio-hydantoin, dihydroxythiazole and their N-substitution products.

The dyestuffs produced in accordance with the present invention are sensitisers for photographic silver halide emulsions and the invention also includes photographic silver halide emulsions sensitised with the dyestuffs produced in accordance with the present invention.

The invention is illustrated by the following specific examples which are given by way of example only. The equations given in the specification illustrate what is believed to be reactions taking place, but we do not bind ourselves to the equations given.

EXAMPLE 1

A. *Preparation of 3-ethyl-2-thio-4-keto-5-(N-methyldihydrobenzoxazolylidene) - tetrahydrothiazole*

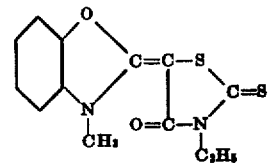

16.5 gms. of 1-methylthiolbenzoxazole and 18.6 gms. of methyl-p-toluene sulphonate were fused together for 3½ hours at 130-140° C. After cooling 16.3 gms. of N-ethyl rhodanic acid and 150 ccs. of pyridine were added and the mixture was gently heated to effect solution and then gently boiled under a reflux condenser for about 25 minutes. The yellow mixture was then diluted with water until no further precipitate was formed and the precipitate was filtered off and washed with water and ether and recrystallised from methyl alcohol as yellow crystals melting at 212° C. The reaction may be illustrated as follows:

B. Preparation of 3.3'-diethyl-4.4'-diketo-5.5'-di-(N-methyldihydro benzoxazolylidene)-thiazolino cyanine iodide

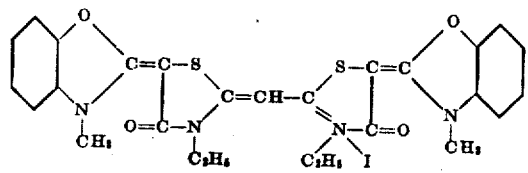

7.7 gms. of the product obtained by condensing N-ethyl-rhodanic acid and 1-methyl-thiolbenzoxazole-methyl-p-toluene sulphonate was fused together with 20 gms. of methyl-p-toluene sulphate at 120° C. for 2½ hours. The mixture was allowed to cool, 5 gms. of malonic acid and 150 ccs. of pyridine were then added and the mixture was gently heated on a water bath for 45 minutes when a rose colour developed. The mixture was then poured into a beaker containing a dilute aqueous solution of 30 gms. of potassium iodide. A bronze precipitate was formed which was filtered and washed with water, spirit and ether and recrystallised as bronze crystals, melting at 260° C. with decomposition and giving purple-red alcoholic solutions. The reaction may be illustrated as follows:

of malonic acid and 15 ccs. of pyridine but pouring into water instead of potassium iodide, yielding 0.12 gm. of golden crystals, melting at over 310° C.

This dye is a sensitiser for silver halide photographic emulsions and extends the sensitivity range of a silver iodo-bromide emulsion to about λ 6300 A. with a maximum at about λ 6000 A.

3.3'-diethyl - 4.4' - diketo-5.5'-di(2 - methyldihydrobenzthiazolylidene - 1 - ethylidine) thiazolino-cyanine bromide was also prepared by the method of Example IB from 0.87 gm. of 2-thio-3-ethyl-4-keto-5 - (2 - methyldihydrobenzthiazolylidene-1-ethylidene) tetrahydrothiazole prepared from 1-ψ-acetanilidovinyl - benzthiazolemethyl-p-toluene sulphonate and N-ethylrhodanic acid according to the method of Example 3A, 3 gms. of methyl-p-toluene sulphonate and 0.5 gm. of malonic acid and 15 ccs. of pyridine using potassium bromide in place of the potassium iodide yielding 0.05 gm. of golden crystals, melting at 285° C. and giving an olive green solution in alcohol.

3.3'-diethyl-4.4'-diketo-5.5'-di(2 - methyldihydrobenzthiazolylidene-1-ethylidene) - thiazolinocyanine bromide was prepared according to the method of Example IB from 0.84 gm. of 2-thio-3-

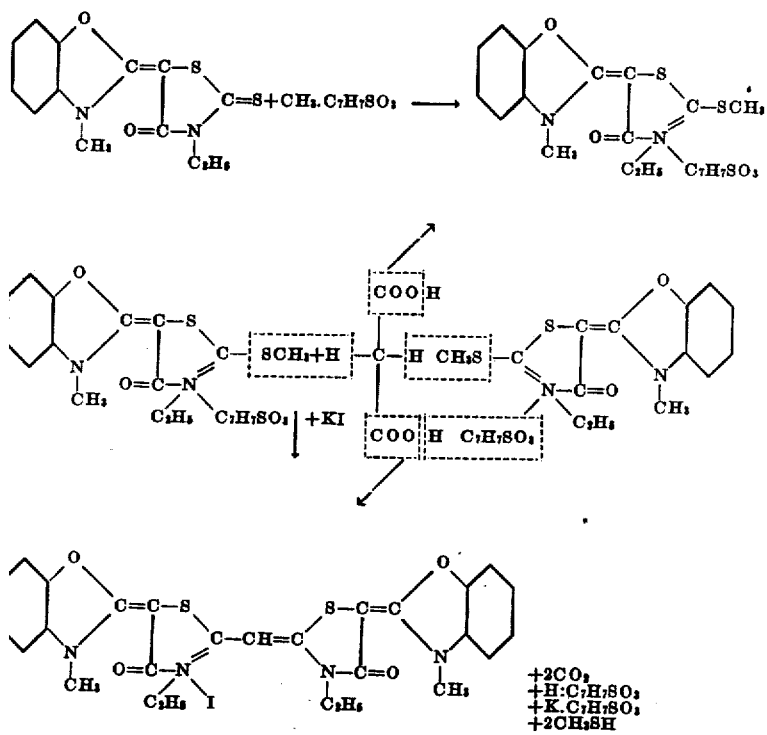

3.3'-diethyl-4.4'-diketo-5.5'-di-(2-methyldihyrobenzthiazolylidene) - thiazolino - cyanine - p-toluene sulphonate was prepared in a similar manner to that described in Example IB from .75 gm. of 2-thio-3-ethyl-4-keto-5-(2-methyldihydrobenzthiazolylidene) tetrahydrothiazole, preared according to the method of Example IA om N-ethyl-rhodanic acid and 1-methylthiol enzthiazole methyl-p-toluene sulphonate, 3 rams of methyl-p-toluene sulphonate, 1.0 gm.

ethyl-4-keto-5-(2 - methyldihydrobenzthiazolylidene-1-ethylidene) - tetrahydrothiazole prepared from 1-ψ-acetanilido-vinyl-benzthiazole-methyl-p-toluene sulphonate and N-ethyl-rhodanic acid according to the method of Example 3A, 3.0 gms. of N-ethyl-rhodanic acid, 0.5 gm. of malonic acid and 15 ccs. of pyridine using potassium bromide in place of the potassium iodide, yielding 0.2 gm. of blue-black crystals, melting at over 290° C. and giving a green solution in alcohol.

EXAMPLE 2

*Preparation of 3-ethyl-2'-methyl-4-keto-5-(2-methyl-di-hydrobenzoxazolylidene)-thiazolino-thiacyanine bromide*

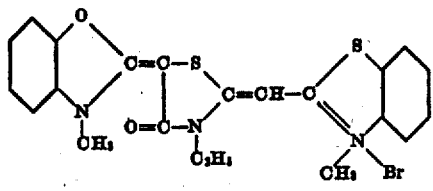

7.5 grams of the product produced according to Example 1A and 3.75 gms. of 1-methyl-benzthiazole and 20 gms. of methyl-p-toluene sulphonate were fused together at 130° C. for 2½ hours. The mixture was then allowed to cool and 150 ccs. of pyridine were added and the mixture was reheated on a boiling water bath to effect solution and then gently boiled under a reflux condenser for a further 20 minutes. The mixture was then poured into a large bulk of water containing potassium bromide. Orange crystals separated out, which were filtered off, washed with spirit and ether and extracted by boiling out with methyl alcohol. The dyestuff was then recrystallised from methyl alcohol yielding small red-brown crystals with blue-green reflex, melting at 291° C. with decomposition.

The reaction is believed to take place as follows:

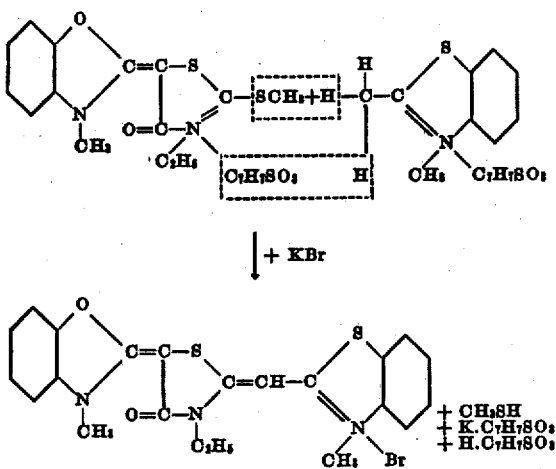

2'-methyl-3-ethyl-4-keto-5-(2-methyldihydrobenzoxazolylidene)-thiazolino-oxacyanine iodide was obtained by reacting 0.70 gm. of the substance obtained by the process of Example 1A with 0.33 gm. of 1-methylbenzoxazole and 4 gms. of ethyl-p-toluene sulphonate according to the process of Example 2 but using 15 ccs. of alcohol and 0.5 gm. of anhydrous sodium acetate in place of the pyridine and potassium iodide in place of the potassium bromide, yielding 0.22 gm. of small golden brown crystals, melting at 279° C.

This dye is a sensitiser for photographic emulsions and extends the sensitivity range of a silver iodo-bromide emulsion to about γ 5800 A.

The following products were also obtained by the same general method as described in Example 2 from the compounds indicated. In each case the substituted tetrahydro thiazole was prepared by the general method described in Example 1A from the corresponding N-alkylrhodanic acid and the quaternary salt of the corresponding methyl-thiol heterocyclic nitrogen compound.

If the p-toluene sulphonates of the dye were required water was employed in the place of the potassium bromide and if other salts were required the corresponding alkali salt was used.

2'-ethyl-3-methyl-4-keto-5 - (2 - methyldi-hydro - benzoxazolylidine) - thiazolino - oxacyanine iodide from 0.70 gm. of the 2-thio-3-methyl-4-keto-5-(2-methyldihydrobenzoxazolylidene) tetrahydrothiazole, 0.33 gm. of 1-methylbenzoxazole and 4 gms. of ethyl-p-toluene sulphonate but 15 ccs. of alcohol and 0.5 gm. of anhydrous sodium acetate in place of the pyridine yielding 0.18 gm. of small dark red crystals, melting at 291° C.

This dyestuff is a sensitiser for silver halide photographic emulsions and extends the sensitivity range of a silver iodo-bromide emulsion to about λ 6200 A. with a maximum at about λ 5600 A.

3-methyl-2'-ethyl-4-keto-5-(2-methyldihydrobenzthiazolylidene)-thiazolino-thiacyanine-p-toluene sulphonate from 0.73 gm. of 2-thio-3-methyl-4-keto-5-(2-methyldihydrobenzthiazolylidene)-tetrahydrothiazole, 4 gms. of ethyl-p-toluene sulphonate and 0.37 gm. of 1-methylbenzthiazole, yielding 0.79 gm. of small red crystals, having a gold reflex melting at 283° C.

This dyestuff is a sensitiser for silver halide photographic emulsions and increases the sensitivity range of a silver iodo-bromide emulsion to about λ 6200 A. with a maximum at about λ 5400 A.

3.2'-diethyl-4-keto-5 - (2 - methyldihydrobenzthiazolylidene) - thiazolinothiacyanine - p - toluene sulphonate was prepared from 0.77 gm. of 2-thio-3-ethyl-4-keto-5-(2 - methyldihydrobenzthiazolylidene)-tetrahydrothiazole and the same quantities of the other compounds as in the preceding example, yielding 0.80 gm. of small scarlet needles, melting at 280° C.

This dyestuff is a sensitiser for silver halide photographic emulsions and extends the sensitivity range of a silver iodo-bromide emulsion to about λ 6200 A. with a maximum at about λ 5400 A.

3.1'-diethyl-4-keto-5 - (2 - methyldihydrobenzthiazolylidene)-thiazolino-2' - quinocyanine bromide from 0.75 gm. of 2-thio-3-ethyl-4-keto-5-(2 - methyldihydrobenzthiazolylidene) - tetrahydrothiazole, 0.36 gm. of quinaldine, 4 gms. of ethyl-p-toluene sulphonate and 15 ccs. of pyridine, yielding 0.29 gm. of dark maroon crystals, melting at 271° C.

This dye is a sensitiser for silver halide photographic emulsions and extends the sensitivity range of a silver iodo-bromide emulsion to about λ 6400 A. with a maximum at about λ 5400 A.

3.1'-diethyl-4-keto-5-(2 - methyldihydrobenzthiazolylidene) - thiazolino - 4' - quinocyanine iodide was prepared similarly to the preceding example, but using 0.36 gm. of lepidine in place of the quinaldine and potassium iodide solution in place of the potassium bromide solution used in Example 2 yielding 0.50 gm. of dark blue crystals melting at 288-9° C.

This dyestuff is a sensitiser for photographic silver halide photographic emulsions and extends the sensitivity range of a silver iodo-bromide emulsion to about λ 6300 A. with a maximum at about λ 6000 A.

3 - methyl - 1' - ethyl - 4 - keto - 5 - (2 - methyldihydrobenzthiazolylidene) - thiazolino - 2'-quinocyanine-p-toluene sulphonate was also prepared from 0.73 gm. of the corresponding 2-thio-3 - methyl - 4 - keto - 5 - (2 - methyldihydrobenzthiazolylidene)-tetrahydro thiazole and the same quantities of the other compounds as used in the preceding examples yielding 0.12 gm. of shining dark green crystals, melting at 278° C.

This dyestuff is a sensitiser for silver halide photographic emulsions and extends the sensitivity range of a silver iodo-bromide emulsion to about λ 6200 A. with a maximum at about λ 5600 A.

3.2' - diethyl - 4 - keto - 5 - (2 - methyldihydrobenzthiazolylidene) - thiazolinooxacyanine - p - toluene sulphonate from 0.77 gm. of 2-thio-3-ethyl - 4 - keto - 5 - (2 - methyldihydrobenzthiazolylidene) - tetrahydrothiazole, 0.33 gm. of 1-methylbenzoxazole, 4 gms. of ethyl-p-toluene sulphonate and 15 ccs. of pyridine yielding on crystallization from methyl alcohol 0.19 gm. of scarlet matted needles melting at 288° C.

This dyestuff is a sensitiser for photographic silver halide emulsions and increases the sensitivity range of a silver iodo-bromide emulsion to about λ 6200 A. with a maximum at about λ 5200 A. It also extends the sensitivity range of a silver chloride emulsion to about λ 5400 A with a maximum at about λ 5100 A.

3 - methyl - 2' - ethyl - 4 - keto - 5 - (2 - methyldihydrobenzthiazolylidene) - thiazolino - oxacyanine-p-toluene sulphonate from 0.73 gm. of 2 - thio - 3 - methyl - 4 - keto - 5 - (2 - methyldihydrobenzthiazolylidene) - tetrahydrothiazole and the same quantities of the other compounds as in the preceding examples, yielding 0.42 gm. of dye crystallized from methyl alcohol as small brick red crystals melting at 292° C. with decomposition.

This dyestuff is a sensitiser for silver halide photographic emulsions and extends the sensitivity of a silver iodo-bromide emulsion to about λ 6200 A. with a maximum at about λ 5200 A. It also extends the sensitivity of a silver chloride emulsion to about λ 5400 A. with a maximum at about λ 5100 A.

3.2' - diethyl - 4 - keto - 5 - (2 - methyldihydrobenzthiazolylidene) - thiazolino - seleno - cyanine-p-toluene sulphonate from 0.75 gm. of 2-thio - 3 - ethyl - 4 - keto - 5 - (2-methyldihydrobenzthiazolylidene) - tetrahydrothiazole, 0.49 gm. of 1-methylbenzselenazole and 3 gms. ethyl - p-toluene sulphonate and 15 ccs. of pyridine yielding 0.29 gm. of small orange crystals, melting at 258° C. The filtrate from the crystals was treated with potassium bromide and a further crop of 0.20 gm. of crystals of the bromide salt were obtained.

The dyestuff is a sensitiser for silver halide photographic emulsions and extends the sensitivity range of a silver iodo-bromide emulsion to about λ 5800 A. with a maximum at about λ 5400 A.

3 - methyl - 2' - ethyl - 4 -keto - 5 - (1 - methyldihydroquinolylidene) - thiazolinooxacyanine bromide from 0.72 gm. of 2-thio-3-methyl-4-keto - 5 - (1 - methyldihydroquinolylidene) tetrahydrothiazole, 0.33 gm. of 1-methylbenzoxazole and 4 gms. of ethyl-p-toluene sulphonate using 15 ccs. of alcohol and 0.5 gm. of sodium acetate in place of pyridine, yielding 0.23 gm of dark olive green crystals, melting at 267° C.

This dyestuff is a sensitiser for silver halide photographic emulsions and increases the sensitivity of a silver iodo-bromide emulsion to about λ 6200 A. with a maximum at about λ 5600 A.

3.2' - diethyl - 4 - keto - 5 - (1 - methyldihydroquinolylidene) -thiazolino-thiacyanine iodide from 0.75 gm. of 2-thio-3-ethyl-4-keto-5-(1-methyldihydroquinolylidene) - tetrahydrothiazole, 0.37 gm. of 1-methylbenzthiazole, 4 gms. of ethyl-p-toluene sulphonate and 15 ccs. of pyridine, yielding 0.23 gm. of dark olive green crystals, melting at 284° C.

This dyestuff is a sensitiser for silver halide photographic emulsions and extends the sensitivity range of a silver iodo-bromide emulsion to about λ 6600 A. with a maximum at about λ 5700 A.

3.2'-diethyl - 4 - keto-5-(1-methyldihydroquinolylidene)-thiazolinooxacyanine iodide from 0.75 gm. of 2-thio-3-ethyl-4-keto-5-(1-methyldihydroquinolylidene)-tetrahydrothiazole, 0.33 gm. of 1-methylbenzoxazole, 4 gms. of ethyl-p-toluene sulphonate and 15 ccs. of pyridine, yielding 0.21 gm. of dark olive green crystals, melting at 264° C. with decomposition.

This dyestuff is a sensitiser for silver halide photographic emulsions and extends the sensitivity range of a silver iodo-bromide emulsion to about λ 6200 A with a maximum at about λ 5600 A.

3.1'-diethyl-4-keto- 5 -(1-methyldihydroquinolylidene)-thiazolino-pseudo-cyanine iodide from 0.75 gm. of 2-thio-3-ethyl-4-keto-5-(1-methyldihydroquinolylidene) - tetrahydro - thiazole, 0.36 gm. of quinaldine, 4.0 gms. of ethyl-p-toluene sulphonate, yielding 4.0 gms. of ethyl-p-toluene sulphonate yielding 0.03 gm. of dark olive green crystals, melting at 275° C.

This dyestuff is a sensitiser for silver halide photographic emulsions and extends the sensitivity range of a silver iodo-bromide photographic emulsion to about λ 6600 A. with a maximum at about λ 5600 A.

3-methyl-2'-ethyl-4-keto-5-(1-methyldihydroquinolylidene)-thiazolinothiacyanine iodide from 0.72 gm. of 2-thio-3-methyl-4-keto-5-(1-methyldihydroquinolylidene)-tetrahydrothiazole, 0.37 gm. of 1-methylbenzthiazole, 4 gms. of ethyl-p-toluene sulphonate and 15 ccs. of pyridine yielding 0.27 gm. of dark brown green crystals, melting at 276° C.

This dyestuff is a sensitiser for photographic silver halide emulsions and extends the sensitivity range of a silver iodo-bromide emulsion to about λ 6700 A. with a maximum at about λ 5700 A.

3-methyl-2'-ethyl-4-keto-5-(3-methyldihydroquinazolylidene-4-)-thiazolinothiacyanine p-toluene sulfonate from 0.72 gm. of 2-thio-3-methyl-4-keto-5-(3 - methyldihydroquinazolylidene-4-)-tetrahydrothiazole, 0.37 gm. of 1-methylbenzthiazole 4 gms. ethyl-p-toluene sulphonate and 15 ccs. of pyridine yielding 0.41 gm. of brick red matted crystals, melting at over 300° C.

The formula of the dye is believed to be:

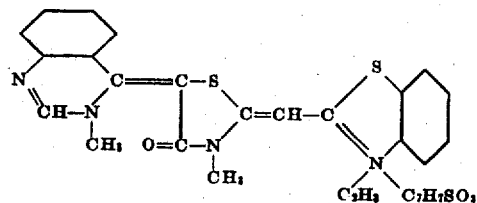

This dyestuff is a sensitiser for silver halide photographic emulsions and extends the sensitivity range of a silver iodo-bromide emulsion to about λ 6200 A. with a maximum at about λ 5600 A.

3.2'-diethyl-4-keto- 5 -(3-methyldihydroquinazolylidene-4-)-thiazolino thiacyanine-p-toluene sulphonate from 0.75 gm. 2-thia-3-ethyl-4-keto-5-(3-methyldihydroquinazolylidene - 4)-tetrahydrothiazole, and the same quantities of the other compounds as in the previous example, yielding 0.38 gm. of dark green brown crystals, melting at over 300° C.

This dye is a sensitiser for silver halide photographic emulsions and extends the sensitvity range of a silver iodo-bromide emulsion to about λ 6200 A. with a maximum at about λ 5700 A.

3-methyl-2'-ethyl-4-keto-5-(3-methyldihydroquinazolylidene - 4 - )-thiazolino-oxacyanine-p-toluene sulphonate from 0.72 gm. of 2-thio-3-methyl-4-keto-5-(3 - methyldihydroquinazolylidene-4-)-tetrahydrothiazole, 0.33 gm. of 1-methylbenzoxazole and 4 gms. of ethyl-p-toluene sulphonate but using 15 ccs. of alcohol and 0.5 gm. of anhydrous sodium acetate in place of the pyridine yielding 0.24 gm. of brown matted crystals, melting at 310° C.

This dye is a sensitiser for silver halide photographic emulsions and extends the sensitivity range of a silver iodo-bromide emulsion to about λ 6400 A. with a maximum at about λ 5600 A.

3.2'-diethyl-4-keto - 5-(3-methyldihydroquinazolylidene-4-) - thiazolino - oxacyanine bromide from 0.75 gm. of 2-thio-3-ethyl-4-keto-5-(3-methyldihydroquinazolylidene - 4 - )-tetrahydrothiazole, 0.33 gm. of 1-methylbenzoxazole, 4 gms. of ethyl-p-toluene sulphonate, 0.3 gm. of anhydrous sodium acetate and 15 ccs. of alcohol and pouring the mixture after boiling into a solution of potassium bromide, yielding 0.4 gm. of small olive green crystals, melting at 280° C. with decomposition.

This dye is a sensitiser for silver halide photographic emulsions and extends the sensitivity range of a silver iodo-bromide emulsion to about λ 5800 A. with a maximum at about λ 5500 A.

3.methyl-1'-ethyl-4-keto-5-(3-methyldihydroquinazolylidene-4-)-thiazolino-ψ-cyanine-p-toluene sulphonate from 0.72 gm. of 2-thio-3-methyl-4-keto-5-(3 - methyldihydroquinazolylidene-4-) - tetrahydrothiazole, 0.36 gm. of quinaldine, 4 gms. of ethyl-p-toluene sulphonate and 15 ccs. of pyridine, yielding 0.06 gm. of deep olive green crystals, melting at 297° C. with decomposition.

This dye is a sensitiser for silver halide photographic emulsions and extends the sensitivity range of silver iodo-bromide emulsion to about λ 6300 A. with a maximum at about λ 5300 A.

3.1'-diethyl-4-keto-5-(3 _ methyldihydroquinazolylidene-4-)-thiazolino- ψ -cyanine-p-toluene sulphonate, from 0.75 gm. of 2-thio-3-ethyl-4-keto-5-(3-methyldihydroquinazolylidene-4-)-tetrahydrothiazole, 0.36 gm. of quinaldine, 4 gms. of ethyl-p-toluene sulphonate and 15 ccs. of pyridine, yielding 0.16 gm. of golden brown crystals, melting at 296° C. with decomposition.

This dyestuff is a sensitiser for photographic silver halide emulsions and extends the sensitivity range of a silver iodo-bromide emulsion to about λ 6500 A. with a maximum at about λ 5900 A.

EXAMPLE 3

A. *Preparation of 3-ethyl-2-thio-4-keto-5-(2-methyl-4.5-methylene - dioxy-dihydrobenzthiazolylidene-1-ethylidene) tetra-hydro-thiazole*

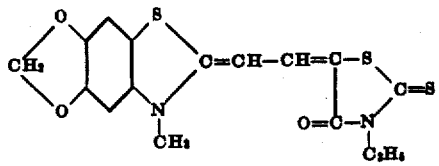

19.3 gms. of 1-methyl-4.5-methylenedioxybenzthiazole and 18.6 gms. methyl-p-toluene sulphonate were fused together for 3½ hours at 140–150° C. The mixture was then allowed to cool and 20 gms. of diphenyl-formamidine and 100 ccs. of acetic anhydride were added and the mixture was boiled under a reflux condenser for about 30 minutes. 18 gms. of N-ethyl-rhodanic acid and 100 ccs. of pyridine were then added and the mixture was again boiled for 30 minutes. A precipitate separated out which was filtered off, washed with spirit and ether and purified by boiling out with methyl alcohol leaving green crystals melting at 305° C. and giving a purple red solution. The reaction may be illustrated as follows:

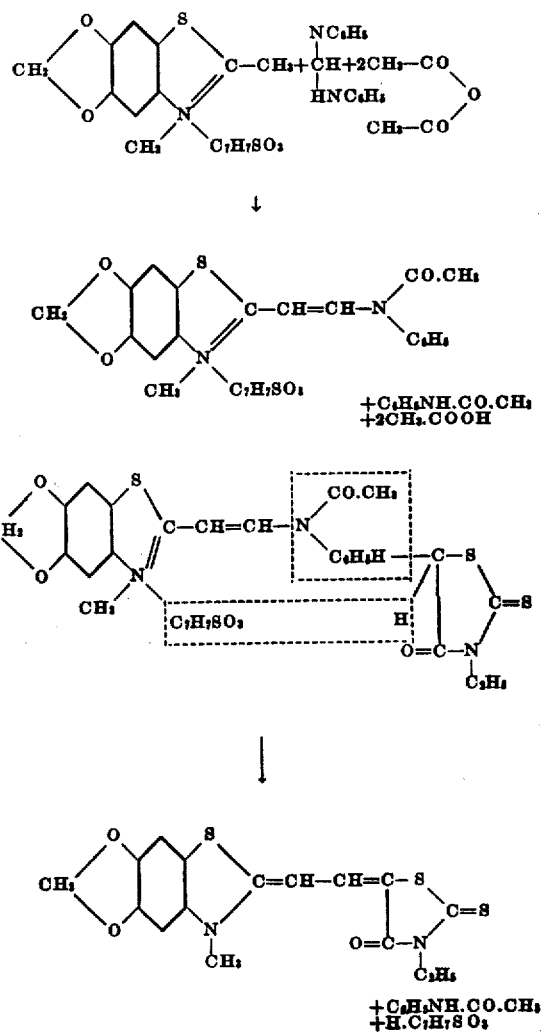

B. *Preparation of 3.3' - diethyl - 4.4'-diketo-5.5'- di-(N-methyl - 4.5 - methylene-dioxy-dihydro- benzthiazolylidene- 1 -ethylidene) thiazolino- cyanine-p-toluene sulphonate*

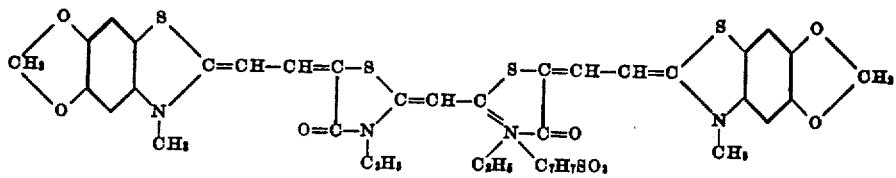

9.4 gms. of the product produced according to 3A above and 40 gms. of methyl-p-toluene sulphonate were fused together for 2 hours at 130° C. The mixture was then cooled and 5 gms. of malonic acid and 150 ccs. of pyridine were added and the mixture gently heated for 45 minutes on a water bath to effect solution. On solution of the melt, a dyestuff separated out. This was filtered off from the liquors, washed with spirit and ether and extracted with benzene leaving dark crystals. The reaction may be illustrated as follows:

allowed to cool and 58.8 gms. of diphenyl-formamidine and 300 ccs. of acetic anhydride were added and the mixture was boiled for twenty minutes. 55 gms. of N-ethyl-rhodanic acid and 300 ccs. of pyridine were then added and the mixture boiled under a reflux condenser for thirty minutes. A dyestuff was precipitated. The mixture was then diluted by pouring into a large bulk of spirit when further dyestuff precipitated. This was filtered off and washed with spirit and ether and purified by boiling out with methyl alcohol,

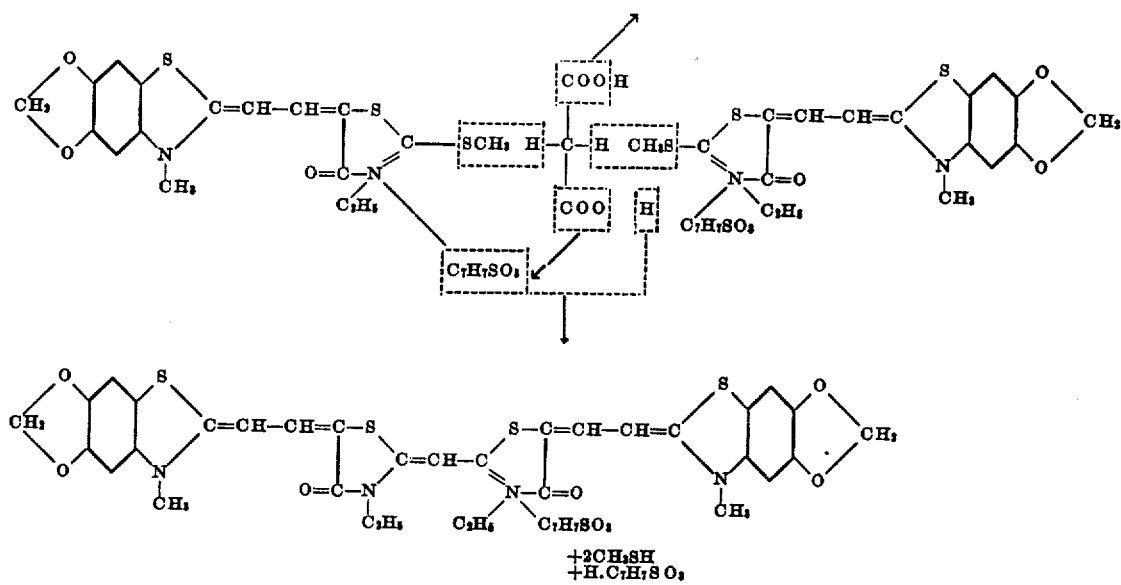

Example 4

A. *Preparation of 3-ethyl-2-thio-4-keto-5-(N-methyl-benzthiazolylidene- 1 -ethylidene)-tetrahydro-thiazole*

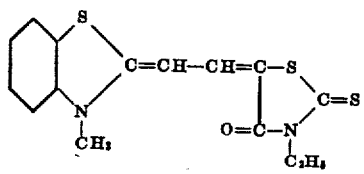

45 gms. of 1-methylbenzthiazole and 59 gms. of methyl-p-toluene sulphonate were fused together for 3 hours at 130° C. The mixture was leaving purple crystals, melting at 273° C., and giving red alcoholic solutions. The reaction may be illustrated as follows:

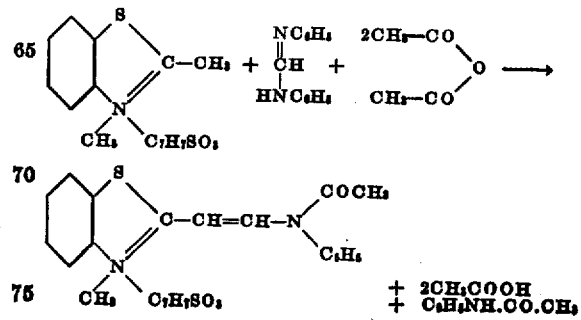

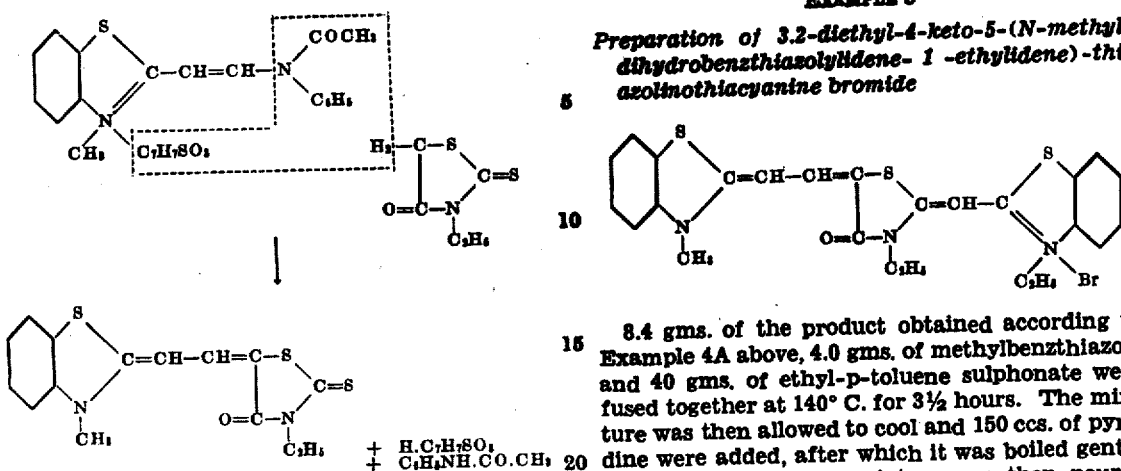

B. *Preparation of 3 - ethyl - 2'-methyl-4-keto-5-(N-methyldihydro-benzthiazolylidene-1 - ethylidene) thiazolino-thia-cyanine bromide*

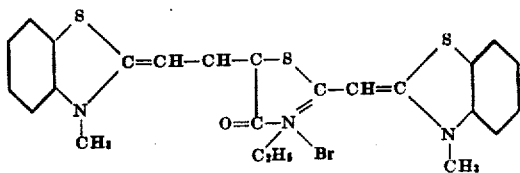

8.4 gms. of the product obtained according to 4A above, 4.0 gms. of 1-methylbenzthiazole and 40 gms. of methyl-p-toluene sulphonate were fused together for 2 hours at 140–150° C. The mixture was then allowed to cool and 150 ccs. of pyridine were added, after which the mixture was heated gently to effect solution, and then boiled gently for 25 minutes. The mixture was then poured into a solution of potassium bromide in water when a precipitate formed. This was filtered off, washed with spirit and ether and extracted with benzene and then methyl alcohol, to yield small dark green crystals melting at 283° C. with decomposition. The reaction may be illustrated as follows:

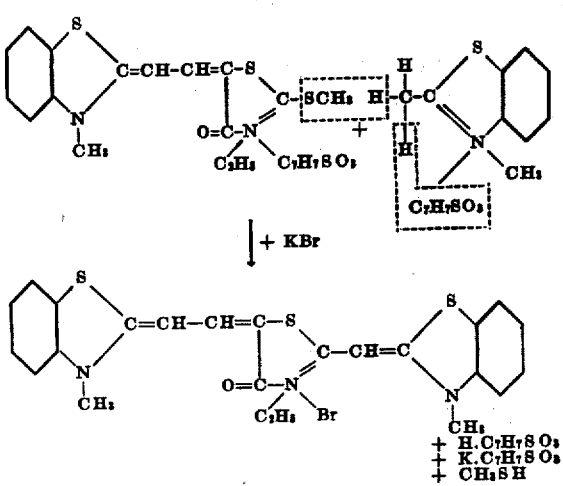

EXAMPLE 5

*Preparation of 3.2-diethyl-4-keto-5-(N-methyldihydrobenzthiazolylidene- 1 -ethylidene)-thiazolinothiacyanine bromide*

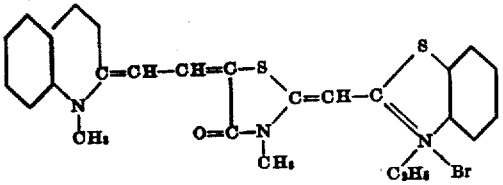

8.4 gms. of the product obtained according to Example 4A above, 4.0 gms. of methylbenzthiazole and 40 gms. of ethyl-p-toluene sulphonate were fused together at 140° C. for 3½ hours. The mixture was then allowed to cool and 150 ccs. of pyridine were added, after which it was boiled gently for 25 minutes. The mixture was then poured into a solution of potassium bromide in water. A precipitate formed, which was filtered off, washed with spirit and ether and extracted with benzene and then methyl alcohol yielding small green crystals, melting at 274° C. with decomposition.

The following preparations were also carried out in similar manner.

Except where otherwise stated in each case the 5-substituted tetrahydrothiazole compound was made from the corresponding amino-vinyl substituted quaternary salt of the corresponding heterocyclic nitrogen compound and the corresponding N-alkyl rhodanic acid according to the method of Example 3A or 4A.

In the case of the para-toluene sulphonate salts of the dyes the reaction mixture after the boiling step was poured into water or crystallised direct and in the case of the other salts, the mixture was poured into a solution of the appropriate alkali salt, e. g. potassium iodide.

3-methyl-2'-ethyl-4-keto-5-(1-methyldihydroquinolylidene - 2 - ethylidene) -thiazolinothiacyanine bromide from 0.79 gm. of 2-thio-3-methyl-4-keto-5-(1-methyldihydroquinolylidine-2-ethylidene)-tetrahydrothiazole, prepared by the condensation of quinaldine methiodide and 5-acetanilidomethenyl-N-methylrhodanic acid in the presence of pyridine, 0.37 gm. of 1-methylbenzthiazole, 4 gms. of ethyl-p-toluene sulphonate and 15 ccs. of pyridine yielding 0.52 gm. of slate-blue matted crystals, melting at 271° C.

The formula of this dye is believed to be as follows:

The dyestuff is a sensitiser for silver halide photographic emulsions and extends the sensitivity range of a silver iodo-bromide emulsion to about λ 7600 Å. with a maximum at about λ 6800 Å.

3.2'-diethyl-4-keto-5-(1-ethyldihydroquinolylidene - 2 - ethylidene) -thiazolinothiacyanine bromide from 0.86 gm. of 2-thio-3-ethyl-4-keto-5-(1-ethyldihydroquinolylidene-2-ethylidene) - tetrahydrothiazole, 0.37 gm. of 1-methylbenzthiazole, 4 gms. of ethyl-p-toluene sulphonate and 15 ccs. of pyridine, 0.26 gm. of dark blue matted crystals, melting at 256° C.

This dyestuff is a sensitiser for silver halide photographic emulsions and extends the sensitivity range of a silver iodo-bromide emulsion to about λ 7600 Å. with a maximum at about λ 6800 Å.

3-methyl-1'-ethyl-4-keto-5-(1-methyldihydroquinolylidene-2-ethylidene)-thiazolino-ψ-cyanine bromide from 0.79 gm. of 2-thio-3-methyl-4-keto-5-(1-methyldihydroquinolylidene-2-ethylidene)-tetrahydrothiazole, prepared by condensing quinaldine methiodide with 5-acetanilido-methenyl-N-methylrhodanic acid in the presence of pyridine, 0.36 gm. of quinaldine, 4 gms. of ethyl-p-toluene sulphonate and 15 ccs. of pyridine yielding 0.18 gm. of dark blue matted crystals, melting at 251° C.

3-ethyl-2'-methyl-4-keto-5-(1.3.3-trimethylindolylidene-2-ethylidene)-thiazolinothiacyanine bromide from 0.86 gm. of 2-thio-3-ethyl-4-keto-5-(1.3.3-trimethylindolylidene-2-ethylidene)-tetrahydrothiazole, 0.37 gm. of 1-methylbenzthiazole, 3 gms. of methyl-p-toluene sulphonate and 15 ccs. of pyridine yielding 0.22 gm. of green crystals, melting at 257° C.

This dyestuff is a sensitiser for silver halide photographic emulsions and extends the sensitivity range of a silver iodi-bromide emulsion to about λ 6600 Å. with a maximum at about λ 6100 Å.

3-methyl-2'-ethyl-4-keto-5-(1.3.3-trimethylindolylidene-2-ethylidene)-thiazolinothiacyanine-p-toluene sulphonate from 0.83 gm. of 2-thio-3-methyl-4-keto-5-(1.3.3-trimethyl dihydroindolylidene ethylidene)-tetrahydrothiazole, 0.37 gm. of 1-methylbenzthiazole, 3 gms. of ethyl-p-toluene sulphonate and 15 ccs. of pyridine yielding 0.51 gm. of dark olive-green crystals, melting at over 306° C.

This dyestuff is a sensitiser for silver halide photographic emulsions and extends the sensitivity range of a silver iodo-bromide emulsion to about λ 6600 A. with a maximum at about λ 6000 A.

3-methyl-2'-ethyl-4-keto-5-(1.3.3-trimethyldihydroindolylidene-2-ethylidene)-thiazolinooxacyanine bromide from 0.83 gm. of 2-thio-3-methyl-4-keto-5-(1.3.3-trimethyldihydroindolylidene-2-ethylidene)-tetrahydrothiazole and 0.33 gm. of 1-methylbenzoxazole, 3-gms. of ethyl-p-toluene sulphonate and 15 ccs. of pyridine, yielding 0.18 gm. of small green crystals, melting at 271° C.

This dyestuff is a sensitiser for silver halide photographic emulsions and extends the sensitivity range of a silver iodo-bromide emulsion to about λ 6300 A. with a maximum at about λ 5800 A.

3-1'-diethyl-4-keto-5-(1.3.3-trimethyldihydroindolylidene-2-ethylidene)-thiazolino-ψ-cyanine-p-toluene-sulfonate from 0.86 gm. of 2-thio-3-ethyl-4-keto-5-(1.3.3-trimethyldihydroindolylidene-2-ethylidene)-tetrahydrothiazole, 0.36 gm. of quinaldine, 3 gms. of ethyl-p-toluene sulphonate, 15 ccs. of pyridine, yielding 0.11 gm. of brown-gold crystals, melting at 272° C.

3-methyl-2'-ethyl-4-keto-5-(2-methyldihydrobenzthiazolylidene-1-ethylidene)-thiazolinothiacyanine bromide from 0.80 gm. of 2-thio-3-methyl-4-keto-5-(2-methyldihydrobenzthiazolylidene-1-ethylidene)-tetrahydro-thiazole, 0.37 gm. of 1-methylbenzthiazole, 4 gms. of ethyl-p-toluene sulphonate and 16 ccs. of pyridine, yielding 0.43 gm. of slate-grey matted crystals, melting at 267° C. with decomposition.

This dyestuff is a sensitiser for photographic silver halide emulsions and extends the sensitivity range of a silver-iodo-bromide emulsion uniformly to about λ 6400 A. and tailing off to about λ 7000 A.

3-methyl-2'-ethyl-4-keto-5-(2-methyldihydrobenzthiazolylidene-2-ethylidene)-thiazolino-oxacyanine bromide from 0.80 gm. of 2-thio-3-methyl-4-keto-5-(2-methyldihydrobenzthiazolylidene-1-ethylidene)-tetrahydrothiazole, 0.33 gm. of 1-methylbenzoxazole, 4 gms. of ethyl-p-toluene sulphonate and 15 ccs. of pyridine, yielding 0.18 gm. of slate-blue matted crystals, melting at 283° C. with decomposition.

This dyestuff is a sensitiser for silver halide emulsion and extends the sensitivity range of a silver iodo-bromide emulsion to about λ 6900 A. with a maximum at about λ 6500 A.

3-methyl-1'-ethyl-4-keto-5-(2-methyldihydrozenzthiazolylidene-1-ethylidene)-thiazolino-ψ-cyanine bromide from 0.80 gm. of 2-thio-3-methyl-4-keto-5-(2-methyldihydrobenzthiazolylidene-1-ethylidene)-tetrahydrothiazole, 0.36 gm. of quinaldine and 4 gms. of ethyl-p-toluene sulphonate and 15 ccs. of pyridine yielding 0.06 gm. of dark blue matted crystals, melting at 261° C.

This dyestuff is a sensitiser for silver halide photographic emulsions and extends the sensitivity range of a silver iodo-bromide emulsion weakly to about λ 6200 A.

3.1'-diethyl-4-keto-5-(2-methyldihydrobenzthiazolylidene-1-ethylidene)-thiazolinoisocyanine iodide, from 0.84 gm. of 2-thio-3-ethyl-4-keto-5-(2-methyldihydrobenzthiazolylidene-1-ethylidene)-tetrahydrothiazole, 0.36 gm. of lepidine, 3 gms. of ethyl-p-toluene sulphonate and 20 ccs. of pyridine yielding 0.22 gm. of small gold crystals, melting at 280° C. with decomposition giving a blue-green solution in alcohol.

This dyestuff is a sensitiser for photograhic emulsions and extends the sensitivity range of a silver iodo-bromide emulsion to about λ 7800 A.

3.2'-diethyl-4-keto-5-(2-methyldihydrobenzthiazolylidene-1-ethylidene)-thiazolinoselenocyanine-p-toluene sulfonate from 0.84 gm. of 2-thio-3-ethyl-4-keto-5-(2-methyldihydrobenzthiazolylidene-1-ethylidene)-tetrahydrothiazole, 0.49 gm. of 1-methylbenzselenazole and 3 gms. of ethyl-p-toluene sulphonate and 15 ccs. of pyridine yielding 0.35 gm. of deep blue matted crystals, melting at 284° C. with decomposition.

This dyestuff is a sensitiser for photographic silver halide emulsions and extends the sensitivity range of a silver iodo-bromide emulsion to about λ 6800 A. with a fairly uniform sensitivity to about λ 6600 A.

3-methyl-2'-ethyl-4-keto-5-(2-methyldihydrobenzthiazolylidene-1-ethylidene)-thiazolinoselenocyanine bromide from 0.80 gm. of 2-thio-3-methyl-4-keto-5-(2-methyldihydrobenzthiazolylidene-1-ethylidene)-tetrahydrothiazole, 0.49 gm. of 1-methylbenzselenazole, 3 gms. of ethyl-p-toluene sulphonate and 15 ccs. of pyridine, yielding 0.42 gm. of green-blue matted crystals, melting at 280° C. with decomposition.

This dyestuff is a sensitiser for silver halide photographic emulsions and extends the sensitivity range of a silver iodo-bromide emulsion to about λ 6800 A. with a fairly uniform sensitivity to about λ 6500 A.

3.2'-diethyl-4-keto-5 - (2 - methyldihydrobenzthiazolylidene-1-ethylidene)-thiazolino - oxacyanine bromide from 2-thio-3-ethyl-4-keto-5 - (2-methyldihydrobenzthiazolylidene-1 - ethylidene)-tetrahydrothiazole, 0.33 gm. of 1-methylbenzoxazole, 4 gms. of ethyl-p-toluene sulphonate and 15 ccs. of pyridine yielding 0.18 gm. of slate-blue matted crystals, melting at 263° C. with decomposition.

This dye is a sensitiser for silver halide photographic emulsions and increases the sensitivity range of a silver iodo-bromide emulsion to about λ 7000 A. with a maximum at about λ 6400 A.

3.1'-diethyl-4-keto-5-(2 - methyldihydrobenz - thiazolylidene-1-ethylidene)-thiazolino-ψ - cyanine bromide from 0.84 gm. of 2-thio-3-ethyl-4-keto-5-(2-methyldihydrobenzthiazolylidene - 1 - ethylidene)-tetrahydrothiazole, 0.36 gm. of quinaldine, 4.0 gms. of ethyl-p-toluene sulphonate, 15 ccs. of pyridine yielding 0.90 gm. of dark blue matted crystals, melting at 262° C.

This dyestuff is a sensitiser for photographic silver halide emulsion and extends the sensitivity of a silver iodo-bromide emulsion weakly to about λ 6400 A.

3.2'-diethyl-4-keto - 5 - (2 - ethyldihydrobenz - thiazolylidene-1-ethylidene)-thiazolino-oxa-cyanine bromide from 0.87 gm. of 2-thio-3-ethyl-4-keto-5 - (2 - ethyldihydrobenzthiazolylidene - 1 - ethylidene)-tetrahydrothiazole and ethylbenzoxazole, 4 gms. of ethyl-p-toluene sulphonate, 15 ccs. of alcohol and 0.5 gm. of sodium acetate, yielding 0.09 gm. of dark blue matted crystals, melting at 269° C.

This dye is a sensitiser for photographic silver halide emulsions and increases the sensitivity of a silver iodo-bromide emulsion to about λ 6800 A. with a maximum at about λ 6000 A.

3.2' - diethyl - 4 - keto-5-(2-ethyldihydrobenzthiazolylidene-1-ethylidene) - thiazolino - thia - cyanine bromide from 0.87 gm. of 2-thio-3-ethyl-4-keto-5-(2 - ethyldihydrobenzthiazolylidene - 1 - ethylidene)-tetrahydrothiazole, 0.37 gm. of 1-methylbenzthiazole, 4.0 gms. of ethyl-p-toluene sulphonate, and 15 ccs. of pyridine, yielding 0.45 gm. of dark blue matted crystals, melting at 241° C. with decomposition.

The dyestuff is a sensitiser for silver halide photographic emulsions and extends the sensitivity range of a silver iodo-bromide emulsion uniformly to about λ 6500 A., gradually diminishing to zero at about λ 7200 A.

3.2'-diethyl-4-keto-5- (2 - methyldihydrobenz - oxazolylidene-1 - ethylidene) - thiazolinothiacyanine bromide from 0.80 gm. of 2-thio-3-ethyl-4-keto-5-(2 - methyldihydrobenzoxazolylidene - 1 - ethylidene)-tetrahydrothiazole, 0.37 gm. of 1-methyl-benzthiazole, 4 gms. of ethyl-p-toluene sulphonate and 15 ccs. of pyridine yielding 0.10 gm. of grey green crystals melting at 259° C.

This dye is a sensitiser for silver halide photographic emulsions and extends the sensitivity range of a silver iodo-bromide emulsion uniformly to about λ 6400 A. and gradually diminishing to about λ 7100 A.

3.2'-diethyl-4-keto-5- (2 - methyldihydrobenz - oxazolylidene-1-ethylidene)-thiazolino - oxacyanine iodide from 0.80 gm. of 2-thio-3-ethyl-4-keto-5-(2 - methyldihydrobenzoxazolylidene - 1 - ethylidene)-tetrahydrothiazole, 0.33 gm. of 1-methyl-benzoxazole, 4 gms. of ethyl-p-toluene sulphonate and 15 ccs. of pyridine, yielding 0.19 gm. of dark olive green crystals, with a gold reflex melting at 255° C.

The dye is a sensitiser for silver halide photographic emulsions and extends the sensitivity range of a silver iodo-bromide emulsion to about λ 7200 A., with a maximum effect to about λ 6200 A.

3.1'-diethyl-4-keto-5-(2-methyldihydrobenzoxazolylidene-1-ethylidene)-thiazolino - ψ - cyanine iodide from 0.80 gm. of 2-thio-3-ethyl-4-keto-5-(-2 - methyldihydrobenzoxazolylidene - 1 - ethylidene)-tetrahydrothiazole, 0.36 gm. of quinaldine. 0.4 gm. of ethyl-p-toluene sulphonate and 15 ccs. of pyridine, yielding 0.08 gm. of dark blue matted crystals, melting at 267° C. with decomposition.

3-methyl-1'- ethyl-4-keto-5-(2-methyldihydrobenzoxazolylidene - 1 - ethylidene) - thiazolino-ψ-cyanine bromide from 0.76 gm. of 2-thio-3-methyl-4-keto-5 -(2-methyldihydrobenzoxazolylidene-1-ethylidene)-tetrahydrothiazole, 0.36 gm. of quinaldine, 4 gms. of ethyl-p-toluene sulphonate and 15 ccs. of pyridine yielding 0.06 gm. of dark blue matted crystals, melting at 262° C. with decomposition.

This dye is a sensitiser for silver halide photographic emulsions and extends the sensitivity of a silver iodo-bromide emulsion weakly to about λ 6200 A.

3-methyl-2'- ethyl-4-keto-5-(2-methyldihydrobenzoxazolylidene-1-ethylidene) - thiazolino - oxacyanine iodide from 0.76 gm. of 2-thio-3-methyl-4 - keto-5 -(2-methyldihydrobenzoxazolylidene-1-ethylidene)-tetrahydrothiazole, 0.33 gm. of 1-methylbenzoxazole, 4 gms. of ethyl-p-toluene sulphonate, and 15 ccs. of pyridine, yielding 0.22 gm. of small green crystals, with a gold reflex melting at 270° C. with decomposition.

This dye is a sensitiser for silver halide photographic emulsions and extends the sensitivity range of a silver iodo-bromide emulsion to about λ 6800 A. with a maximum at about λ 6200 A.

3-methyl-2'-ethyl-4-keto-5-(2-methyldihydrobenzoxazolylidene - 1 - ethylidene)-thiazolinothiacyanine bromide from 0.76 gm. of 2-thio-3-methyl-4-keto-5-(2-methyldihydrobenzoxazolylidene-1-ethylidene)-tetrahydrothiazole, 0.37 gm. of 1-methylbenzthiazole, 4 gms. of ethyl-p-toluene sulphonate, 15 ccs. of pyridine, yielding 0.35 gm. of bright green crystals, melting at 284° C. with decomposition.

The dye is a sensitiser for silver halide photographic emulsions and extends the sensitivity range of a silver iodo-bromide emulsion to about λ 6800 A., with a maximum at about λ 6200 A.

3.2'- diethyl-4-keto-5-(2 - ethyldihydrobenzoxazolylidene-1-ethylidene) - thiazolinothiacyanine iodide, from 0.83 gm. of 2-thio-3-ethyl-4-keto-5-(2-ethyldihydrobenzoxazolylidene-1-ethylidene)-tetrahydrothiazole, 0.37 gm. of 1-methylbenzthiazole, 4 gms. of ethyl-p-toluene sulphonate, 15 ccs. of pyridine yielding 0.19 gm. of green crystals, melting at 247° C. with decomposition.

The dye is a sensitiser for silver halide photographic emulsions and extends the sensitivity range of a silver iodo-bromide emulsion to about λ 7500 A. with a maximum at about λ 6600 A.

3.2'-diethyl-4-keto-5-(2-methyldihydrobenzoxazolylidene-1-ethylidene) - thiazolino-oxacyanine iodide from 0.83 gm. of 2-thio-3-ethyl-4-keto-5-(2-ethyldihydrobenzoxazolylidene-1-ethylidene)-tetrahydrothiazole, 0.33 gm. of 1-methylbenzoxazole, 4 gms. of ethyl-p-toluene sulphonate, 15 ccs. of alcohol, 0.5 gm. anhydrous sodium acetate, yielding 0.08 gm. of small bright green crystals, melting at 280° C. with decomposition.

Example 6

A

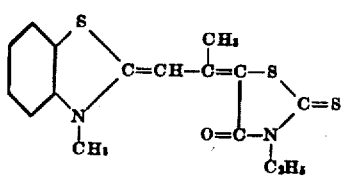

14.9 gms. of 1-methyl-benzthiazole and 18.6 gms. of methyl-p-toluene sulphonate were fused together for 2½ hours at 130-140° C. After cooling, 16.1 gms. of N-ethyl-rhodanic acid, 120 ccs. of pyridine and 30 ccs. acetic anhydride were added and the mixture was heated gently to effect solution and then boiled under reflux for 1½ hours. It was then poured into 50 ccs. of methyl alcohol and a precipitate separated out on cooling. The precipitate was filtered off, washed with spirit and ether and recrystallised from methyl alcohol to give red brown crystals melting at 235° C. and giving orange alcoholic solutions. The reaction may be illustrated as follows:

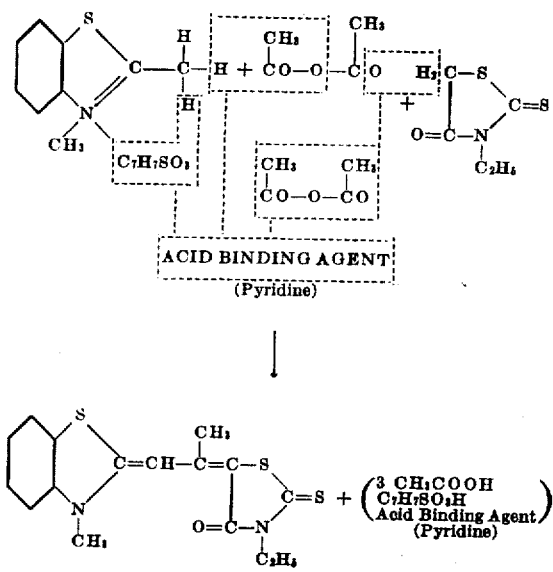

B. Preparation of

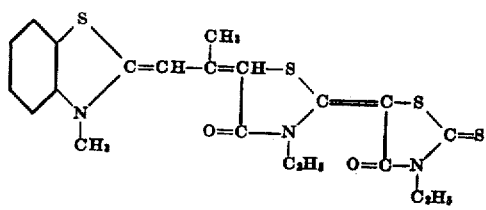

7.7 gms. of the compound prepared as above and 30 gms. of methyl-p-toluene sulphonate were fused together for 2 hours at 130-140° C. After cooling 4 gms. of N-ethyl rhodanic acid and 150 ccs. of pyridine were added and the mixture was heated gently to effect solution and then boiled gently for 20 minutes. A precipitate separated out from the hot solution. This was filtered off and washed with spirit and ether, and was purified by boiling out with methyl alcohol leaving fine slate coloured needle crystals melting above 300° C. and giving purple-red alcoholic solutions. The reaction may be illustrated as follows:

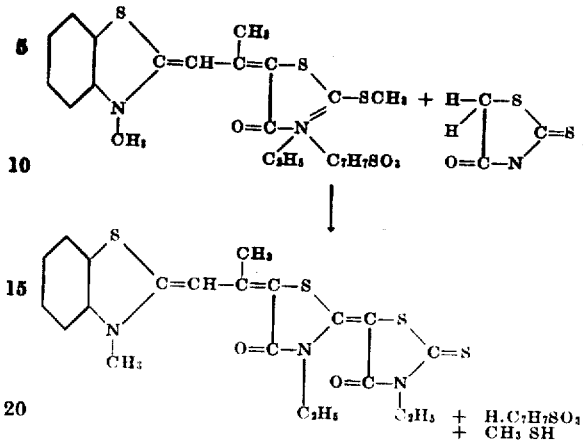

C. Preparation of

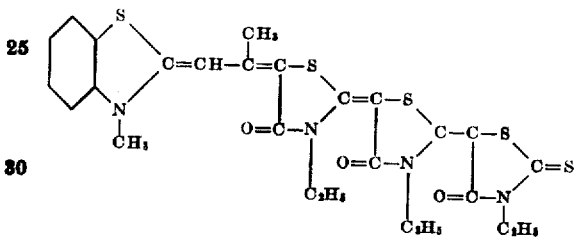

4.33 gms. of the product obtained according to the process of Example 6B and 10 gms. of methyl-p-toluene sulphonate were fused together for 2½ hours at 140-150° C. the mixture was then allowed to cool and 1.61 gms. of N-ethyl-rhodanic acid and 100 ccs. of pyridine were added after which the mixture was gently heated to effect solution and then boiled gently for about 30 minutes.

A precipitate separated from the hot solution and after cooling was filtered off, washed with water, spirit and ether and purified by boiling out with methyl alcohol, leaving greenish crystals which dissolved in alcohol to give bright blue solutions. The reaction may be illustrated as follows:

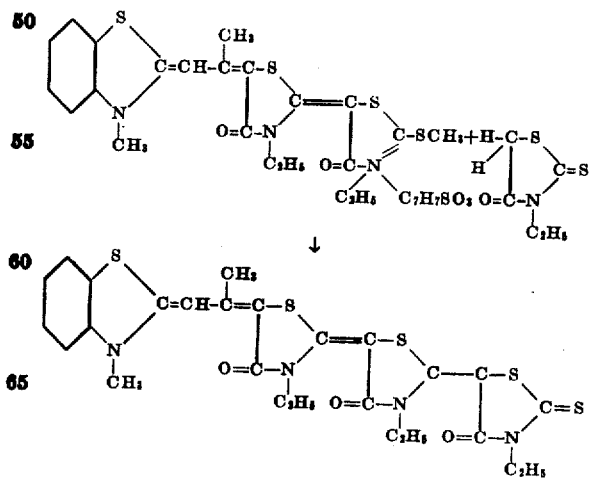

Example 7

0.75 gm. of 3-ethyl-2-thio-4-keto-5-(2-methyldihydrobenzthiazolylidene)-tetrahydrothiazole, prepared by condensing 1-methylthiolbenzthiazole methyl-p-toluene sulphonate with N-ethyl-rhodanic acid according to the general method of Example 1A and 3 gms. of ethyl-p-toluene sulphonate were fused together for four hours at 150° C. The mixture was cooled and 0.50 gm. of N-ethylrhodanic acid and 30 ccs. of pyridine were added and the mixture was gently boiled under a reflux condenser for about 30 minutes, during which time a dyestuff separated out. After this the mixture was poured into a beaker and allowed to stand. The product which separated out was filtered off and washed with alcohol and purified by extraction with 100 ccs. of hot methyl alcohol, leaving 0.55 gms. of orange matted crystals, melting at over 313° C.

The formula of the final product is believed to be:

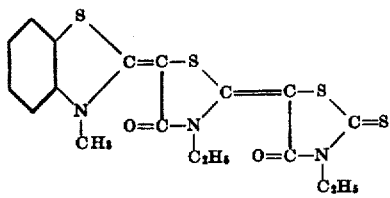

Example 8

0.73 gm. of 2-thio-3-ethyl-4-keto-5-(2-methyl-di-hydrobenzoxazolylidene)-tetrahydrothiazole prepared according to Example 1A and 3 gms. of methyl-p-toluene sulphonate were fused together for four hours at 140° C. The mixture was allowed to cool after which 0.5 gm. of N-ethyl rhodanic acid and 15 ccs. of pyridine were added and the mixture was boiled gently under a reflux condenser for about 30 minutes. The solution was then poured into a beaker and allowed to stand and cool when the dyestuff separated out. The dyestuff was filtered off, washed with alcohol and ether and purified by boiling with 90 ccs. of methyl alcohol, leaving 0.41 gm. of orange matted crystals, melting at over 305° C.

The formula of the product is believed to be:

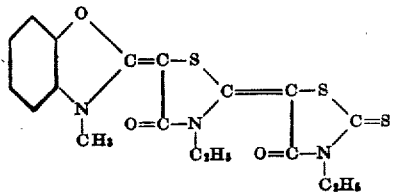

This dye is a sensitiser for silver halide photographic emulsions and extends the sensitivity range of a silver-iodobromide emulsion to about λ 5800 A. with a maximum at about λ 5200 A.

The following analogous products were also prepared in a similar manner. In each case the substituted tetrahydrothiazoles were obtained by the method of Example 1A from the corresponding methylthiol heterocyclic nitrogen quaternary salts and the corresponding N-alkyl rhodanic acids.

(A) From 0.75 gm. 2-thio-3-ethyl-4-keto-5-(1-methyldihydroquinolylidene)-tetrahydrothiazole, 3 gms. of ethyl-p-toluene sulphonate and 0.50 gm. of N-ethyl rhodanic acid, yielding 0.34 gm. of crimson needles, melting at over 350° C.

This dye is a sensitiser for photographic silver halide emulsions and extends the sensitivity range of a silver iodo-bromide emulsion to about λ 6200 A. with a maximum at about λ 5900 A.

(B) From 0.73 gm. of 2-thio-3-methyl-4-keto-5-(2-methyl-dihydrobenzthiazolylidene)-tetrahydrothiazole, 3 gms. of ethyl-p-toluene sulphonate, 0.5 gm. of N-ethylrhodanic acid and 20 ccs. of pyridine, yielding 0.52 gm. of orange matted crystals, melting at over 313° C.

(C) From 0.70 gm. of 2-thio-3-ethyl-4-keto-5-(2-methyldihydrobenzoxazolylidene)-tetrahydrothiazole, 3.0 gms. of ethyl-p-toluene sulphonate, 0.50 gm. of N-ethyl rhodanic acid and 15 ccs. of pyridine yielding 0.45 gm. of orange matted crystals, melting at over 313° C.

(D) From 0.72 gm. of 2-thio-3-methyl-4-keto-5-(1-methyldihydroquinolylidene)-tetrahydrothiazole, 3 gms. of methyl-p-toluene sulphonate, 0.3 gm. of N-ethyl rhodanic acid and 15 ccs. of pyridine yielding 0.63 gm. of crimson needles melting at over 305° C.

This dye is a sensitiser for photographic silver halide emulsions and extends the sensitivity range of a silver iodo-bromide emulsion to about λ 6000 A.

(E) From 0.72 gm. of 2-thio-3-methyl-4-keto-5-(3-methyl dihydroquinazolylidene - 4-) - tetrahydrothiazole, 3 gms. of ethyl-p-toluene sulphonate, 0.5 gm. of N-ethyl-rhodanic acid and 15 ccs. of pyridine yielding 0.22 gm. of very small dark blue crystals, melting at over 306° C.

This dyestuff is a sensitiser for photographic silver halide emulsions and extends the sensitivity of a silver iodo-bromide emulsion to about λ 6000 A. with a maximum at about λ 5750 A.

Example 9

0.84 gm. of 2-thiol-3-ethyl-4-keto-5-(2-methyl-dihydrobenzthiazolylidene-1-ethylidene)-tetrahydrothiazole prepared by condensing N-ethyl rhodanic acid with 1-ω-acetanilidovinylbenzthiazole methyl-p-toluene sulphonate according to the method of Example 3A were fused together with 3 gms. of ethyl-p-toluene sulphonate for 4 hours at 150° C. The mass so obtained was allowed to cool and 0.41 gm. of N-ethyl-rhodanic acid were added together with 15 ccs. of pyridine and the mixture was boiled gently under a reflux condenser for about 30 minutes. The mixture was poured into a beaker and allowed to stand and cool. The dyestuff separated out and was filtered off and washed with alcohol and purified by extracting repeatedly with hot methyl alcohol until the yellow impurity was removed, leaving 0.20 gm. of small very dark green crystals, melting at 302° C. decomposing at 308° C.

The formula of this compound is believed to be:

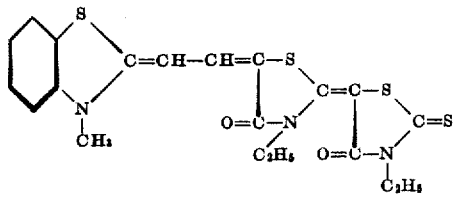

This dyestuff is a sensitiser for photographic silver halide emulsions and extends the sensitivity range of a silver iodo-bromide emulsion to about λ 7000 A. with a maximum at about λ 6500 A.

The following analogous compounds were prepared by the same general method from the materials indicated. Except where otherwise stated in each case the substituted tetrahydrothiazole was prepared by the methods described in Examples 3A and 4B from the corresponding N-alkyl rhodanic acids and the quaternary ammonium salts of the corresponding ψ-acetanilidovinylheterocyclic nitrogen compounds.

(A) 0.80 gm. of 2-thio-3-ethyl-4-keto-5-(2-methyldihydrobenzoxazolylidene -1 - ethylidene)-tetrahydrothiazole obtained by condensing N- ethyl-rhodanic acid with 1-ω-acetanilido vinyl-benzoxazole methyl-p-toluene sulphonate in the presence of pyridine, 3 gms. of ethyl-p-toluene sulphonate, 0.41 gm. of N-ethyl rhodanic acid and 15 ccs. of pyridine yielding 0.20 gm. of shining gold brown crystals, melting at 312° C.

This dye is a sensitiser for photographic silver halide emulsions and extends the sensitivity range of a silver iodo bromide emulsion to about λ 6600 Å. with a maximum at about λ 6200 Å.

(B) From 0.80 gm. of 2-thio-3-methyl-4-keto-5-(2- methyldihydrobenzthiazolylidene-1 - ethylidene)-tetrahydrothiazole, 0.4 gm. of ethyl-p-toluene sulphonate, 0.41 gm. of N-ethyl-rhodanic acid and 15 ccs. of pyridine and yielding 0.17 gm. of dark blue crystals, melting at over 300° C.

This dye is a sensitiser for photographic silver halide emulsions and extends the sensitivity range of a silver iodo-bromide emulsion to about λ 6700 Å. with a maximum at about λ 6400 Å.

(C) From 0.76 gm. of 2-thio-3-methyl-4-keto-5-(2-methyldihydrobenzoxazolylidene - 1 - ethylidene)-tetrahydro-thiazole, 3 gms. of ethyl-p-toluene sulphonate, 0.41 gm. of N-ethyl-rhodanic acid and 15 ccs. of pyridine, yielding 0.18 gm. of small dark brown crystals, melting at over 312° C.

This dye is a sensitiser for silver halide photographic emulsions and extends the sensitivity range of a silver iodo-bromide emulsion to about λ 6400 Å. with a maximum at about λ 6200 Å.

(D) From 0.79 gm. of 2-thio-3-methyl-4-keto-5-(1-methyldihydroquinolylidene-2 - ethylidene)- tetrahydrothiazole, prepared by condensing quinaldine methiodide with 5-ω-acetanilido-methylene-N-methyl-rhodanic acid, 3 gms. of ethyl-p-toluene sulphonate, 0.5 gm. of N-ethyl-rhodanic acid and 15 ccs. of pyridine yielding 0.34 gm. of small purple crystals, melting at over 305° C.

EXAMPLE 10

1.75 gms. of the product obtained according to Example 9 above were fused with 4 gms. of methyl-p-toluene sulphonate for four hours at 140–150° C. The mixture was then allowed to cool and 0.62 gm. of N-ethyl-rhodanic acid and 15 ccs. of pyridine were added after which the mixture was boiled gently under a reflux condenser for about thirty minutes. The resulting solution was poured into a beaker and allowed to stand and the dyestuff which separated out was filtered off and washed with alcohol and ether leaving 1.54 gms. of crude dye. 0.5 gm. of this crude dye were purified by boiling with methyl alcohol and filtering, leaving 0.36 gm. of a blackish-purple powder, melting at over 300° C.

This dye is a sensitiser for silver halide photographic emulsions and extends the sensitivity range of a silver iodo-bromide emulsion to about λ 7200 Å. with a maximum at about λ 6500 Å.

The formula of this compound is believed to be:

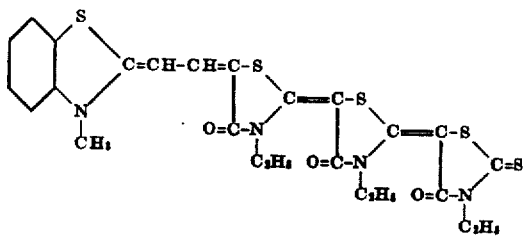

EXAMPLE 11

0.84 gm. of the 2-thio-3-ethyl-4 - keto - 5 - (2-methyldihydrobenzthiazolylidene - 1-ethylidene)- tetrahydrothiazole was produced by the method of Example 4A from 1-ω-acetanilidovinylbenzthiazole methol-p-toluene sulphonate and N-ethyl-rhodanic acid, were fused with 3 gms. of methyl-p-toluene sulphonate for four hours at 140–150° C. The mixture was allowed to cool and 0.44 gm. of 1-phenyl-3-methyl-5-pyrazolone and 15 ccs. of pyridine were added and the mixture was boiled gently under a reflux condenser for about 20 minutes. The resulting solution was poured into a beaker containing a little alcohol and the whole was allowed to stand and cool. A dyestuff crystallised out on cooling and was filtered off and washed with alcohol and ether and purified by boiling with 200 ccs. of methyl alcohol and filtered off, leaving 0.35 gm. of blue crystals melting at 287° C.

The formula of the dyestuff is believed to be:

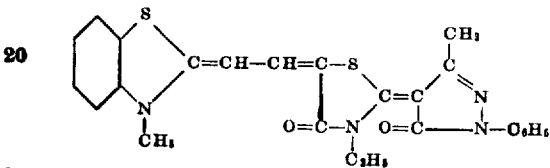

This dyestuff is a sensitiser for silver halide photographic emulsions and extends the sensitivity range of a silver iodo-bromide emulsion to about λ 6700 Å. with a uniform band to about λ 6200 Å.

EXAMPLE 11A

A similar compound was prepared by the same general method as in Example 11 from 0.86 gm. of 2-thio-3-ethyl-4-keto-5-(1 - ethyldihydroquinolylidene - 2 - ethylidene)-tetrahydrothiazole prepared by condensing quinaldine ethiodide and 5ω-acetanilido-methylene-N-ethyl-rhodanic acid together in the presence of pyridine 3 gms. of methyl-p-toluene sulphonate, 0.44 gm. of 1-phenyl-3-methyl-5-pyrazolone and 15 ccs. of pyridine, yielding 0.57 gm. of green needle crystals, melting at 245° C.

This dye is a sensitiser for photographic silver halide emulsions and extends the sensitivity range of a silver iodobromide emulsion to about λ 6400 Å. with a maximum at about λ 5700 Å.

EXAMPLE 11B

A similar compound was prepared by the same general method from 0.74 gm. of 2-thio-3-methyl-4-keto-5 - (2 - methyldihydrobenzthiazolylidene)- tetrahydrothiazole prepared according to the method described in Example 1A from 1-methyl-thiolbenzthiazole methyl-p-toluene sulphonate and N-methyl rhodanic acid, 5 gms. of methyl-p-toluene sulphonate, 0.44 gm. of 1-phenyl-3-methyl-5-pyrazolone and 15 ccs. of pyridine yielding 0.68 gm. of minute deep yellow crystals, melting at 286° C. and giving a lemon yellow solution in alcohol.

This dye is a sensitiser for photographic silver halide emulsions and extends the sensitivity range of a silver chloride emulsion to about λ 5100 Å. with a maximum at about λ 4900 Å.

EXAMPLE 12

3-ethyl-4-keto - 5 - (2 - methyldihydrobenzthiazolylidene)-thiazolino-2'.2'-ketazine. 0.77 gm. of 2-thio-3-ethyl-4-keto-5-(2-methyl dihydrobenzthiazolylidene)-tetrahydrothiazole prepared according to the method of Example 1A from 1-methylthiolbenzthiazole methyl-p-toluene sulphonate and N-ethylrhodanic acid, were fused together with 3.0 gms. of methyl-p-toluene sulphonate for four hours at 140-150° C. The mass was allowed to cool and 0.13 gm. of hydrazine hydrochloride and 15 ccs. of pyridine were added and the mixture was boiled gently under a reflux condenser for about 25 minutes. The mixture was then poured into a beaker and allowed to stand after which the product which separated out was filtered off, washed with alcohol and ether and then purified by boiling with 200 ccs. of methyl alcohol and filtered leaving 0.35 gm. of a lemon yellow powder melting at over 292° C.

The product is believed to have the formula:

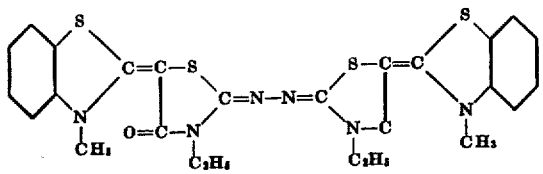

EXAMPLE 12A 3-ethyl-4-keto-5-(2-methyldihydrobenzthiazolylidene-1-ethylidene-thiazolino-2.2'-ketazine was prepared in a similar manner to Example 12 from 0.84 gm. of 2-thio-3-ethyl-4-keto-5-(2-methyl dihydrobenzthiazolylidene-1-ethylidene)-tetrahydrothiazole prepared by the method of Example 3A from 1-ω-acetanilidovinyl-benzthiazole methyl-p-toluene sulphonate and N-ethyl-rhodanic acid, 3.0 gms. of methyl-p-toluene sulphonate, 0.13 gm. of hydrazine and 15 ccs. of pyridine yielding 0.14 gm. of golden brown flake crystals melting at 292° C. and giving a deep yellow solution in spirit.

The formula of this dye is believed to be:

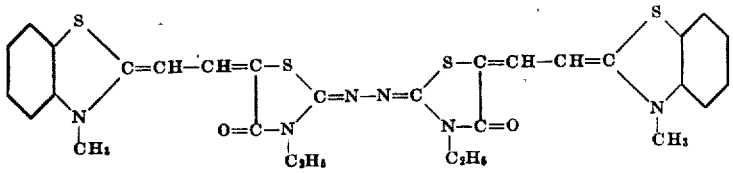

This dye is a sensitiser for photographic silver halide emulsions and extends the sensitivity range of a silver iodo-bromide emulsion to about λ 6200 Å. and of a silver chloride emulsion to about λ 5400 Å. with a maximum at about λ 5100 Å.

EXAMPLE 13

3-methyl-2'-ethyl-4-keto-5-(p-dimethylaminobenzal)-thiazolinothiacyanine iodide. 0.71 gm. of 2-thio-3-methyl-4-keto-5-(p-dimethylaminobenzal)-tetrahydrothiazole prepared by the condensation of N-methyl-rhodanic acid and p-dimethylaminobenzaldehyde were fused with 3 gms. of ethyl-p-toluene sulphonate and 0.37 gm. of 1-methylbenzthiazole for four hours at 140-150° C. The mass was then allowed to cool and 15 ccs. of pyridine were added and the mixture was gently boiled under a reflux condenser for about 30 minutes. The mixture was then poured into a beaker and allowed to stand and cool. The liquid was then filtered off and mixed with an aqueous solution of potassium iodide when the dyestuff separated out. This dyestuff was filtered off and washed with alcohol and ether and finally purified by boiling with benzene and filtering. The residue was recrystallised from two lots of 90 ccs. of boiling methyl alcohol yielding 0.20 gm. of purple matted crystals melting at 286° C.

The compound is believed to be represented by the formula:

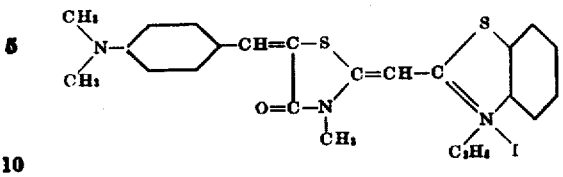

This dye is a sensitiser for photographic silver halide emulsion and extends the sensitivity range of a silver iodo-bromide emulsion weakly to about λ 5800 Å.

EXAMPLE 14

3.2'-diethyl-4-keto-5-(2-methyldihydrobenzthiazolylidene)-thiazolinothiacyazine-p-toluene sulphonate. 0.77 gm. of 2-thio-3-ethyl-4-keto-5-(2-methyldihydrobenzthiazolylidene)-tetrahydrothiazole, prepared according to the method of Example 1A from 1-methylthiolbenzthiazole methyl-p-toluene sulphonate and N-ethyl-rhodanic acid, were fused together with 0.38 gm. of 1-aminobenzthiazole and 3 gms. of ethyl-p-toluene sulphonate for four hours at 140-150° C.

The mixture was allowed to cool, 15 ccs. of pyridine were added and the whole was then boiled gently under a reflux condenser for about thirty minutes, and then poured into a beaker and diluted with water. The dye which precipitated out was filtered off, washed with alcohol and then with hot benzene and again with alcohol and finally with ether.

The dye was boiled with 10 ccs. of methyl alcohol and filtered and crystallised, yielding 0.28 gm. of vermillion plate crystals melting at 222° C. and giving a lemon yellow solution in alcohol. The formulae of this dyestuff is believed to be as follows:

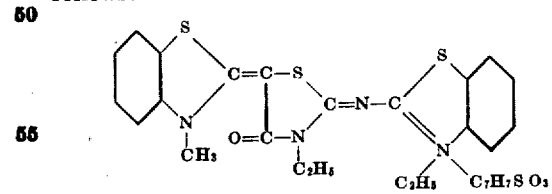

EXAMPLE 14A 3.2'-diethyl-4-keto-5-(2-methyldihydrobenzthiazolylidene-1-ethylidene)-thiazolinothiacyazine iodide was prepared in a similar manner from 0.84 gm. of 2-thio-3-ethyl-4-keto-5-(2-methyldihydrobenzthiazolylidene-1-ethylidene)-tetrahydrothiazole, prepared as described in Example 4A, 0.38 gm. of 1-aminobenzthiazole, 3.0 gms. of ethyl-p-toluene sulphonate and 15 ccs. of pyridine with the additional step of pouring the mixture after boiling into a solution of potassium iodide, yielding 0.20 gm. of dark green long narrow plates, melting at 286° C.

EXAMPLE 15

3.3'-diethyl-4.4'-diketo-5.5'-di(2-methyldihydrobenzthiazolylidene)-thiazolinocyazine bromide. 0.75 gm. of 2-thio-3-ethyl-4-keto-5-(2-methyldihydrobenzthiazolylidene) - tetrahydrothiazole prepared by the method of Example 1A from 1-methylthiolbenzthiazole methyl-p-toluene sulphonate and N-ethyl-rhodanic acid were fused with 3 gms. of methyl-p-toluene sulphonate for 3 hours at 150° C. The mixture was allowed to cool and 0.40 gm. of finely ground ammonium nitrate and 15 ccs. of pyridine were added and the mixture was boiled gently under a reflux condenser for about 45 minutes. The mixture was poured into a solution of potassium bromide and allowed to stand. The precipitate which was formed was filtered off and washed with alcohol, hot benzene and ether and was finally purified by crystallising from 50 ccs. of methyl alcohol, yielding 0.17 gm. of scarlet crystals with a gold reflux melting at 217° C.

The formula of the dye is believed to be:

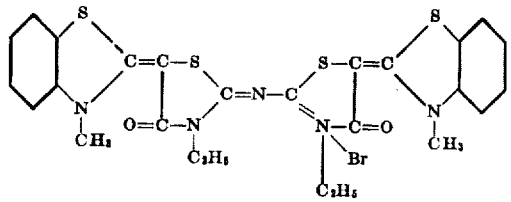

Example 16

3.3'- diethyl-4.4'-diketo-5.5'-di(2 - methyldihydrobenzthiazolylidene) - thiazolino - 6.6' - orthophenylene-carbocyanine - p - toluene sulphonate. 0.77 gm. of 2-thio-3-ethyl-4-keto-5-(2-methyldihydrobenzthiazolylidene) - tetrahydrothiazole prepared according to the method of Example 1A from 1-methylthiolbenzthiazole methyl-p-toluene sulphonate and N-ethyl-rhodanic acid were fused with 3.0 gms. of ethyl-p-toluene sulphonate for four hours at 140° to 150° C. The mixture was allowed to cool and 1 cc. of indene and 15 ccs. of pyridine were added, and the mixture gently heated on a water bath under a reflux condenser for 45 minutes. The contents of the flask were then poured into a beaker and left to crystallise. The dyestuff which crystallised out was filtered off, washed with a little alcohol and then washed repeatedly with hot benzene and then again with alcohol and finally with ether.

The residue was boiled with 10 ccs. of methyl alcohol and filtered off, the residue leaving 0.013 gm. of greenish-brown dyestuff, melting at over 302° C. and giving a blue solution in alcohol.

The formula of this dye is believed to be as follows:

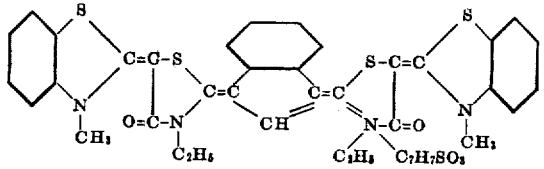

Example 17

3.3'-diethyl-4.4'-diketo-5.5'-di-(2-methyldihydrobenzthiazolylidene) - thiazolino-carbocyanine-p-toluene sulphonate. 0.77 gm. of 2-thio-3-ethyl-4-keto-5-(2 - methyl di-hydrobenzthiazolidene)-tetrahydrothiazole prepared according to Example 1A from 1-methyl-thiolbenzthiazole methyl-p-toluene sulphonate and N-ethyl-rhodanic acid were fused with 3.0 gms. of ethyl-p-toluene sulphonate for four hours at 140–150° C. The mixture was then allowed to cool and 6 gms. of glutaconic acid and 15 ccs. of pyridine were added and the mixture boiled gently for 45 minutes under a reflux condenser. The resulting solution was poured into a beaker and left to crystallise. The precipitate was filtered off, washed with alcohol, hot benzene, alcohol and finally with ether.

The residue was then boiled with 10 ccs. of methyl alcohol and filtered leaving 0.35 gm. of a dirty brown dyestuff, melting at over 300° C. giving a blue solution in alcohol.

The dyestuff is believed to be represented by the following formula:

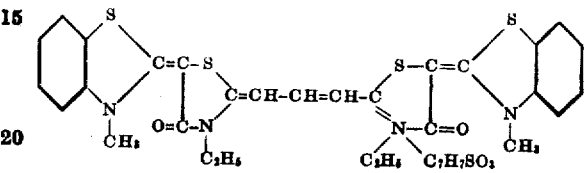

Example 18

0.77 gm. of 2-thio-3-ethyl-4-keto-5-(2'-methylbenzthiazolylidene)-tetrahydrothiazole prepared according to Example 1A from 1-methylthiolbenzthiazole methyl p-toluene sulphonate and N-ethyl-rhodanic acid, were fused with 3 gms. of methyl-p-toluene sulphonate for three hours at 140–150° C. The mixture was then cooled and 0.3 gm. of thiohydantoin and 12 ccs. of pyridine were added and the mixture gently boiled under a reflux condenser for 25 minutes. The resulting mixture was poured into a beaker and allowed to cool when the dyestuff crystallised out. The solution was then diluted with water to complete the precipitation.

The dyestuff was filtered off, washed with alcohol and ether and purified by boiling with 80 ccs. of methyl alcohol and filtered off, leaving 0.32 gm. of small orange crystals melting at 274° C. and giving an orange yellow solution in alcohol.

The formula of this dye is believed to be as follows:

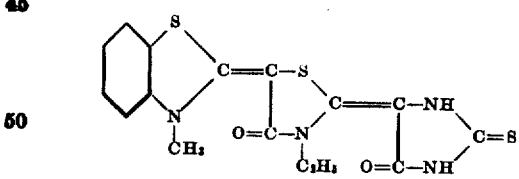

The dye is a sensitiser for silver halide photographic emulsions and extends the sensitivity of a silver iodo-bromide emulsion to about λ 5400 Å. with a maximum at about λ 4800 Å.

Example 19

3-methyl-2'-ethyl-4-keto-5-(2-methyldihydrobenzthiazolylidene - 1 - ethylidene)-oxazolinothiacyanine bromide. 0.76 gm. of 2-thio-3-methyl-4-keto-5-(2-methyldihydrobenzthiazolylidene-1-ethylidene)-tetrahydro-oxazole prepared according to the method of Example 3A from 1-ω-acetanilidovinyl benzthiazole and 2-thio-3-methyl-4-keto-tetrahydro-oxazole, were fused with 0.38 gm. of 1-methylbenzthiazole and 3 gms. of ethyl-p-toluene sulphonate for 4 hours at 140–150° C. The mixture was allowed to cool and 15 ccs. of pyridine was added, the whole was boiled gently under a reflux condenser for 20 minutes. The solution thus obtained was poured into a beaker containing potassium bromide solution and allowed to stand and crystallise. The precipitated dyestuff was filtered off, washed with alcohol then with hot benzene and again with alcohol and finally with ether and the crude product was purified by boiling several times with benzene and finally with methyl alcohol.

The insoluble dyestuff was then filtered off, yielding 0.01 gm. of minute, dull purple crystals, melting at 270° C. and giving a mauve slightly fluorescent solution in alcohol. The formula of this dyestuff is believed to be:

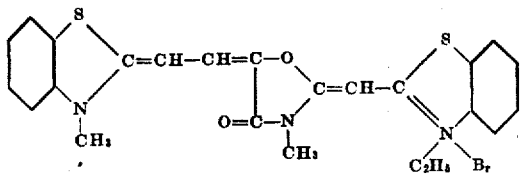

The dyestuff is a sensitiser for silver halide photographic material and extends the sensitivity range of a silver halide emulsion to about λ 6600 A. with a maximum at about λ 6100 A.

EXAMPLE 20

3.2'-diethyl-4-keto - 5-(2-ethyldihydrobenzthiazolylidene-1-ethylidene)-oxazolino-thia-cyanine iodide, was obtained by the same general method as the previous example from 0.80 gm. of 2-thio-3-ethyl-4-keto-5-(2-methyldihydrobenzthiazolylidene-1-ethylidene)-tetrahydro-oxazole prepared according to the general method of Example 3A from 1-ω-acetanilidovinyl-benzthiazole and 2-thio-3-ethyl-4-keto-tetrahydro-oxazole, 0.37 gm. of 1-methylbenzthiazole and 3 gms. of ethyl-p-toluene sulphonate and 15 ccs. of pyridine yielding 0.01 gm. of a blackish-purple dyestuff, melting at 245° C. with decomposition.

This dye is a sensitizer for silver halide photographic emulsions and extends the sensitivity range of a silver iodo-bromide emulsion to about λ 6500 A. with a maximum at about λ 6000 A.

EXAMPLE 21

3.3'-diethyl - 4.4'-diketo-5.5'-di-(2 - methyldihydrobenzthiazolylidene)-thiazolino - carbocyanine-p-toluene sulphonate. 0.75 gm. of 2-thio-3-ethyl-4-keto-5-(2 - methyldi-hydrobenzthiazolylidene-tetrahydrothiazole obtained from 1-methylthiolbenzthiazole-methyl - p - toluene sulphonate and N-ethyl-rhodanic acid according to the method of Example 1A, were fused with 3 gms. of methyl-p-toluene sulphonate for three hours at 150° C. The mixture was cooled and 1 cc. of crotonic anhydride and 15 ccs. of pyridine were added and the mixture was boiled gently under a reflux condenser for 45 minutes during which time the dyestuff separated out. The mixture was then allowed to cool and the dyestuff was filtered off and washed with alcohol, hot benzene and ether and was finally purified by boiling with 10 ccs. of methyl alcohol leaving 0.09 gm. of dark gold crystals, melting at 303° C. with decomposition.

This dye is the same as that produced in Example 17.

We claim:

1. A process for the production of a dyestuff comprising condensing quinaldine methiodide with 5-acetanilido-methenyl-N-methylrhodanic acid in the presence of pyridine and fusing the product with quinaldine and ethyl-p-toluene sulphonate and heating the fused product with pyridine.

2. 3-methyl-1'-ethyl-4-keto-5-(1 - methyl-dihydroquinolylidene-2-ethylidene) - thiazolino-ψ-cyanine bromide having the structural formula

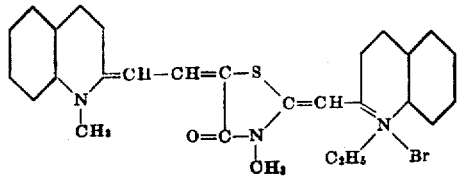

3. A process for the production of a dyestuff wherein 2-thio-3-ethyl-4 - keto-5-(1-methyl-dihydroquinolylidene)-tetrahydrothiazole and ethyl-p-toluene sulphonate are fused together and the fused mixture heated with N-ethyl rhodanic acid and pyridine.

4. 2-thio-3-ethyl-4-keto-5-[3'-ethyl-4' - keto-5'-(1'' methyldihydroquinolylidene - 2'' - ethylidene) - tetrahydrothiazolylidene] tetrahydrothiazole having the structural formula

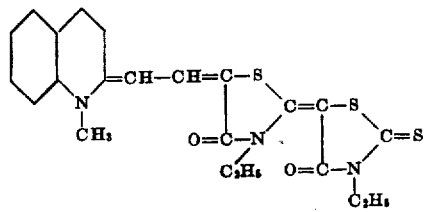

5. The method of producing dyestuffs which comprises condensing a compound of the general formula:

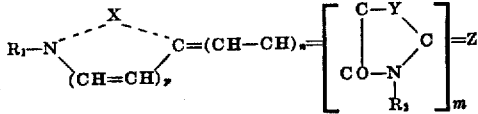

where p is a numeral taken from the group consisting of 0 and 1, n is a numeral taken from the group consisting of 0 and 1, m is a positive small integer, R₁ and R₂ are hydrocarbon groups, X is the residue of a heterocyclic nitrogen compound of the type used in the preparation of cyanine dyes, Y is an atom selected from the group consisting of oxygen and sulphur and Z is an atom selected from the group consisting of sulphur and selenium, with an alkyl salt to convert the group Z into a reactive group, and condensing the product with an organic compound containing a group selected from the class consisting of reactive methyl and reactive methylene groups.

6. The method of producing dyestuffs which comprises condensing a compound of the general formula:

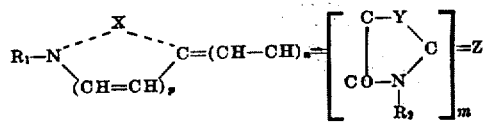

where p is a numeral taken from the group consisting of 0 and 1, n is a numeral taken from the group consisting of 0 and 1, m is a positive small integer, R₁ and R₂ are hydrocarbon groups, X is the residue of a heterocyclic nitrogen compound of the type used in the preparation of cyanine dyes, Y is an atom selected from the group consisting of oxygen and sulphur and Z is an atom selected from the group consisting of sulphur and selenium, with an alkyl salt to convert the group Z into a reactive group, and condensing the product with a heterocyclic organic compound containing a group selected from the class consisting of reactive methyl and reactive methylene groups.

7. The method of producing dyestuffs which comprises condensing a compound of the general formula:

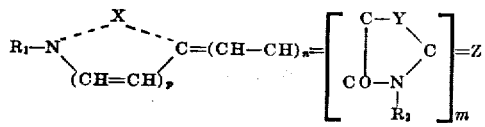

where $p$ is a numeral taken from the group consisting of 0 and 1, $n$ is a numeral taken from the group consisting of 0 and 1, $m$ is a positive small integer, $R_1$ and $R_2$ are hydrocarbon groups, X is the residue of a heterocyclic nitrogen compound of the type used in the preparation of cyanine dyes, Y is an atom selected from the group consisting of oxygen and sulphur and Z is an atom selected from the group consisting of sulphur and selenium, with an alkyl salt to convert the group Z into a reactive group, and condensing the product with an organic compound of the general formula:

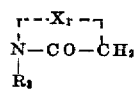

where $X_1$ is the residue of a 5-membered heterocyclic nitrogen ring and $R_3$ is a group selected from the class consisting of hydrogen and hydrocarbon groups.

8. The method of producing dyestuffs which comprises condensing a compound of the general formula:

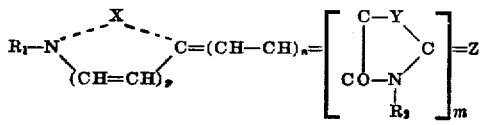

where $p$ is a numeral taken from the group consisting of 0 and 1, $n$ is a numeral taken from the group consisting of 0 and 1, $m$ is a positive small integer, $R_1$ and $R_2$ are hydrocarbon groups, X is the residue of a heterocyclic nitrogen compound of the type used in the preparation of cyanine dyes, Y is an atom selected from the group consisting of oxygen and sulphur and Z is an atom selected from the group consisting of sulphur and selenium, with an alkyl salt to convert the group Z into a reactive group, and condensing the product with an alkyl quaternary salt of a heterocyclic nitrogen compound of the type used in the preparation of cyanine dyes having a reactive methyl group in a position selected from the group consisting of the $\alpha$ and $\gamma$ positions to the heterocyclic nitrogen atom.

9. The method of producing dyestuffs which comprises condensing a compound of the general formula:

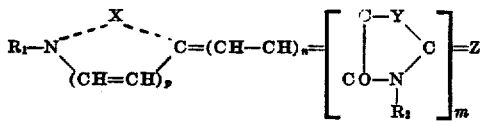

where $p$ is a numeral taken from the group consisting of 0 and 1, $n$ is a numeral taken from the group consisting of 0 and 1, $m$ is a positive small integer, $R_1$ and $R_2$ are lower alkyl radicals, X is the residue of a heterocyclic nitrogen compound of the type used in the preparation of cyanine dyes, Y is an atom selected from the group consisting of oxygen and sulphur and Z is an atom selected from the group consisting of sulphur and selenium, with an alkyl salt to convert the group Z into a reactive group and condensing the product with an N-alkyl rhodanic acid.

10. A method of producing dyestuffs according to claim 9 wherein the alkyl salt employed is an alkyl-p-toluene sulphonate.

11. The method of producing dyestuffs which comprises condensing a compound of the general formula:

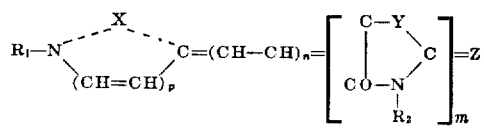

where $p$ is a numeral taken from the group consisting of 0 and 1, $n$ is a numeral taken from the group consisting of 0 and 1, $m$ is a positive small integer, $R_1$ and $R_2$ are hydrocarbon groups, X is the residue of a heterocyclic nitrogen compound of the type used in the preparation of cyanine dyes, Y is an atom selected from the group consisting of oxygen and sulphur and Z is an atom selected from the group consisting of sulphur and selenium, with an alkyl salt to convert the group Z into a reactive group, and condensing the product with an alkyl salt of 2-methyl-benzthiazole.

12. The method of producing dyestuffs according to claim 11 wherein the alkyl salt employed is an alkyl-p-toluene sulphonate.

13. The method of producing dyestuffs which comprises fusing together a compound of the general formula:

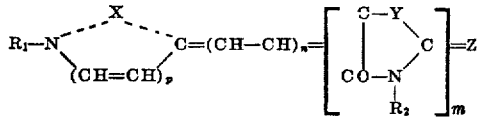

where $p$ is a numeral taken from the group consisting of 0 and 1, $n$ is a numeral taken from the group consisting of 0 and 1, $m$ is a positive small integer, $R_1$ and $R_2$ are hydrocarbon groups, X is the residue of a heterocyclic nitrogen compound of the type used in the preparation of cyanine dyes, Y is an atom selected from the group consisting of oxygen and sulphur and Z is an atom selected from the group consisting of sulphur and selenium, an alkyl-p-toluene sulphonate and a heterocyclic nitrogen compound of the type used in the preparation of cyanine dyes, having a reactive methyl group in a position selected from the group consisting of the $\alpha$ and $\gamma$ positions to the heterocyclic nitrogen atom, and completing the reaction by heating the fused mass in the presence of a solvent and acid binding agent.

14. The method of producing dyestuffs which comprises fusing together a compound of the general formula:

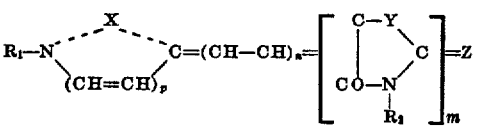

where $p$ is a numeral taken from the group consisting of 0 and 1, $n$ is a numeral taken from the group consisting of 0 and 1, $m$ is a positive small integer, $R_1$ and $R_2$ are hydrocarbon groups, X is the residue of a heterocyclic nitrogen compound of the type used in the preparation of cyanine dyes, Y is an atom selected from the group consisting of oxygen and sulphur and Z is an atom selected from the group consisting of sulphur and selenium, an alkyl-p-toluene sulphonate and an organic compound of the general formula:

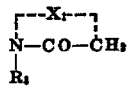

where $X_1$ is the residue of a 5-membered heterocyclic nitrogen ring and $R_3$ is a group selected from the group consisting of hydrogen and hydrocarbon groups, and completing the reaction by heating the fused mass in the presence of a solvent and acid binding agent.

15. The dyestuffs of the general formula:

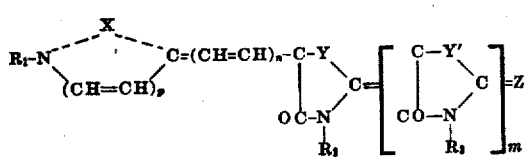

wherein $m$ is a positive small integer, $p$ and $n$ are numerals taken from the class consisting of 0 and 1, $R_1$, $R_2$ and $R_3$ are lower alkyl radicals, X is the residue of a heterocyclic nitrogen compound of the type used in the preparation of cyanine dyes, Y and Y' are atoms taken from the group consisting of oxygen and sulfur, and Z is an atom selected from the group consisting of sulfur and selenium.

16. The dyestuffs of the general formula:

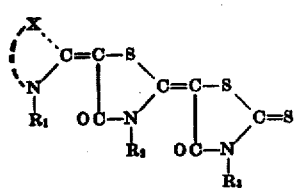

wherein $R_1$, $R_2$ and $R_3$ are lower alkyl radicals, X is the residue of a heterocyclic nitrogen nucleus of the type used in the production of cyanine dyes.

17. The dyestuffs of the general formula:

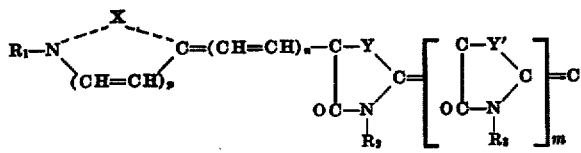

wherein $m$ is a member taken from the group consisting of 0 and a positive small integer, $p$ and $n$ are numerals taken from the class consisting of 0 and 1, $R_1$, $R_2$, $R_3$ and $R_4$ are lower alkyl radicals and X and X' are the residues of heterocyclic nitrogen compounds of the type used in the production of cyanine dyes, Y and Y' are atoms taken from the group consisting of oxygen and sulfur, and K is an acid radical.

18. A process for the production of dyestuffs comprising treating with an alkyl salt a compound of the general formula:

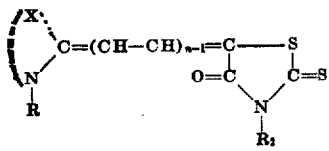

where $n$ is a positive integer less than 3, X is the remainder of a heterocyclic system of the type used in cyanine dyes, R is alkyl, and $R_2$ is a member of the group consisting of alkyl, aryl and aralkyl.

19. A process for the production of dyestuffs comprising treating with an alkyl salt a compound of the general formula:

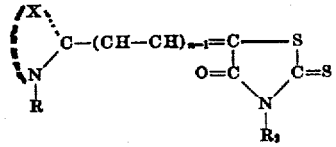

where $n$ is a positive integer less than 3, X is the remainder of a heterocyclic system of the type used in cyanine dyes, R is alkyl, and $R_2$ is a member of the group consisting of alkyl, aryl, and aralkyl, and condensing the intermediate so formed in the presence of an acid binding agent with a compound selected from the class of heterocyclic nitrogen compounds which have a nucleus of the type contained in cyanine dyes and which contain a reactive methyl group in a position taken from the group consisting of the $\alpha$ and $\gamma$ positions to the ring nitrogen atom.

20. The dyestuffs of the general formula:

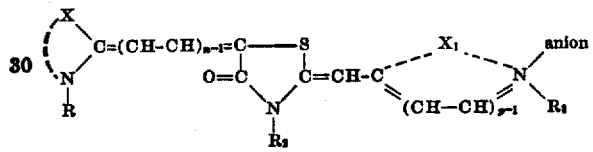

where X and $X_1$ are the remainders of heterocyclic systems of the type used in cyanine dyes, $n$ and $p$ are positive integers less than 3, R and $R_3$ are alkyl, and $R_2$ is a member of the group consisting of alkyl, aryl and aralkyl.

21. A product having the general formula:

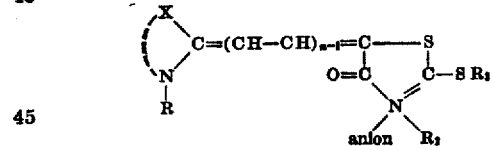

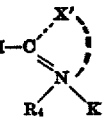

where X is the remainder of a heterocyclic system of the type used in cyanine dyes, $n$ is a positive integer less than 3, R and $R_3$ are alkyl groups, and $R_2$ is a member of the group consisting of alkyl, aryl, and aralkyl.

22. A product of the general formula:

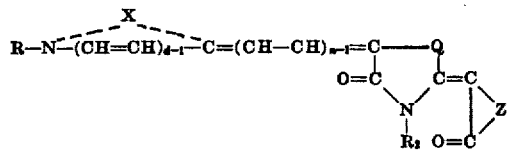

wherein $d$ and $n$ each represents a positive integer of from one to two, Q represents a member selected from the group consisting of oxygen and sulfur atoms, R represents an alkyl group, $R_2$ represents a member selected from the group consisting of alkyl, aralkyl and aryl groups, X represents the remainder of a heterocyclic system of the type used in cyanine dyes and Z represents the remainder of a heterocyclic system.

23. A process for preparing a dye comprising condensing, in the presence of an acid-binding agent, a heterocyclic organic compound containing a ketomethylene group with a compound of the following general formula:

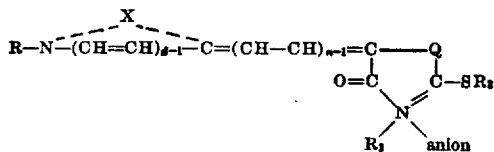

wherein $d$ and $n$ each represent a positive integer of from one to two, Q represents a member selected from the group consisting of oxygen and sulfur atoms, R and $R_3$ each represent an alkyl group, $R_2$ represents a member selected from the group consisting of alkyl, aralkyl and aryl groups and X represents the remainder of a heterocyclic system of the type used in cyanine dyes.

24. A process for preparing a dye comprising condensing, in the presence of an acid-binding agent, malonic acid with a compound of the following general formula:

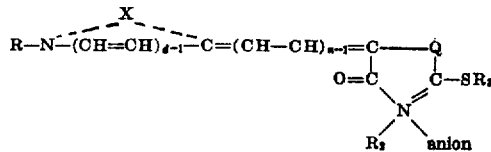

wherein $d$ and $n$ each represent a positive integer of from one to two, Q represents a member selected from the group consisting of oxygen and sulfur atoms, R and $R_3$ each represent an alkyl group, $R_2$ represents a member selected from the group consisting of alkyl, aralkyl and aryl groups and X represents the remainder of a heterocyclic system of the type used in cyanine dyes.

DOUGLAS JAMES FRY.
JOHN DAVID KENDALL.

Certificate of Correction

Patent No. 2,388,963.     November 13, 1945.

DOUGLAS JAMES FRY ET AL.

It is hereby certified that errors appear in the printed specification of the above numbered patent requiring correction as follows: Page 1, first column, line 40, for that portion of the formula reading "CH)$_m$" read $CH)_{n_1}$; page 2, first column, line 51, for "461,688" read *461,668*; page 5, second column, line 49, for "5400 Å" read *5500 Å*; page 6, second column, line 73, in the formula, for "C$_2$H$_3$" read $C_2H_5$; page 7, second column, line 35, for that portion of the formula reading

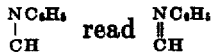

Page 9, first column, line 30, for "CH—C—S" read $CH=C-S$; page 10, first column, line 31, for "iodi-bromide" read *iodo-bromide*; and second column, line 24, for "drozenzthiazolylidene" read *drobenzthiazolylidene*; page 11, first column, line 22, for "0.90" read *0.09*; page 13, first column, line 67, for "350° C." read *305° C.*; page 14, first column, line 75, strike out the word "was"; page 16, first column, line 17, for "reflux" read *reflex*; page 19, first column, line 22, in the formula, for "CO—N" read *OC—N*; and that the said Letters Patent should be read with these corrections therein that the same may conform to the record of the case in the Patent Office.

Signed and sealed this 7th day of May, A. D. 1946.

[SEAL]

LESLIE FRAZER,
*First Assistant Commissioner of Patents.* the type used in cyanine dyes and Z represents the remainder of a heterocyclic system.

23. A process for preparing a dye comprising condensing, in the presence of an acid-binding agent, a heterocyclic organic compound containing a ketomethylene group with a compound of the following general formula:

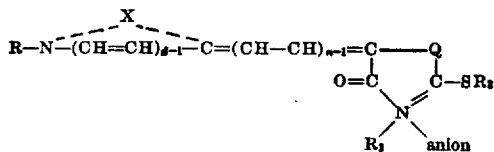

wherein $d$ and $n$ each represent a positive integer of from one to two, Q represents a member selected from the group consisting of oxygen and sulfur atoms, R and $R_3$ each represent an alkyl group, $R_2$ represents a member selected from the group consisting of alkyl, aralkyl and aryl groups and X represents the remainder of a heterocyclic system of the type used in cyanine dyes.

24. A process for preparing a dye comprising condensing, in the presence of an acid-binding agent, malonic acid with a compound of the following general formula:

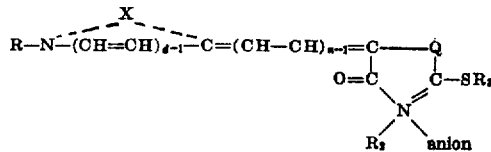

wherein $d$ and $n$ each represent a positive integer of from one to two, Q represents a member selected from the group consisting of oxygen and sulfur atoms, R and $R_3$ each represent an alkyl group, $R_2$ represents a member selected from the group consisting of alkyl, aralkyl and aryl groups and X represents the remainder of a heterocyclic system of the type used in cyanine dyes.

DOUGLAS JAMES FRY.
JOHN DAVID KENDALL.

Certificate of Correction

Patent No. 2,388,963. November 13, 1945.

DOUGLAS JAMES FRY ET AL.

It is hereby certified that errors appear in the printed specification of the above numbered patent requiring correction as follows: Page 1, first column, line 40, for that portion of the formula reading "$CH)_m$" read $CH)_{n_1}$; page 2, first column, line 51, for "461,688" read *461,668*; page 5, second column, line 49, for "5400 Å" read *5500 Å*; page 6, second column, line 73, in the formula, for "$C_2H_3$" read $C_2H_5$; page 7, second column, line 35, for that portion of the formula reading

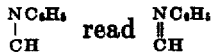

Page 9, first column, line 30, for "CH—C—S" read *CH=C—S*; page 10, first column, line 31, for "iodi-bromide" read *iodo-bromide*; and second column, line 24, for "drozenzthiazolylidene" read *drobenzthiazolylidene*; page 11, first column, line 22, for "0.90" read *0.09*; page 13, first column, line 67, for "350° C." read *305° C.*; page 14, first column, line 75, strike out the word "was"; page 16, first column, line 17, for "reflux" read *reflex*; page 19, first column, line 22, in the formula, for "CO—N" read *OC—N*; and that the said Letters Patent should be read with these corrections therein that the same may conform to the record of the case in the Patent Office.

Signed and sealed this 7th day of May, A. D. 1946.

[SEAL]

LESLIE FRAZER,
*First Assistant Commissioner of Patents.*